(12) United States Patent
Myers et al.

(10) Patent No.: US 6,847,008 B2
(45) Date of Patent: Jan. 25, 2005

(54) ELECTRIC ARC WELDING SYSTEM

(75) Inventors: Russell K. Myers, Hudson, OH (US);
William S. Houston, Avon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 57 days.

(21) Appl. No.: 10/346,023

(22) Filed: Jan. 17, 2003

(65) Prior Publication Data

US 2004/0140302 A1 Jul. 22, 2004

(51) Int. Cl.[7] .................................................. B23K 9/09
(52) U.S. Cl. ................................................. 219/130.51
(58) Field of Search ........................ 219/130.1, 130.51, 219/130.31, 130.32, 130.33, 130.5, 137 PS

(56) References Cited

U.S. PATENT DOCUMENTS

| | | | |
|---|---|---|---|
| 2,673,915 A | * | 3/1954 | Steinert .................. 219/130.1 |
| 5,278,390 A | | 1/1994 | Blankenship |
| 6,111,216 A | | 8/2000 | Stava |
| 6,177,651 B1 | * | 1/2001 | Reynolds et al. ...... 219/137 PS |
| 6,207,929 B1 | | 3/2001 | Stava |
| 6,291,798 B1 | | 9/2001 | Stava |
| 6,472,634 B1 | | 10/2002 | Houston |

FOREIGN PATENT DOCUMENTS

| | | | |
|---|---|---|---|
| DE | 3735834 C1 | * | 4/1989 |
| JP | 10-328827 A | * | 12/1998 |

* cited by examiner

*Primary Examiner*—Clifford C. Shaw
(74) *Attorney, Agent, or Firm*—Fay, Sharpe, Fagan, Minnich & McKee, LLP

(57) ABSTRACT

An electric arc welding system for creating a first AC welding arc with a first current waveform between a first electrode and a workpiece by a first power supply and a second AC welding arc with a second current waveform between a second electrode and a workpiece by a second power supply as the first and second electrodes are moved in unison along a welding path, where the first and second power supply each comprising a high speed switching inverter creating its waveform by a number of current pulses occurring at a frequency of at least 18 kHz with the magnitude of each current pulse controlled by a wave shaper and the polarity of the waveforms is controlled by a signal. The first AC waveform has a positive portion substantially different in energy than its negative portion and/or has either a different shape and/or a synthesized sinusoidal portion.

86 Claims, 12 Drawing Sheets

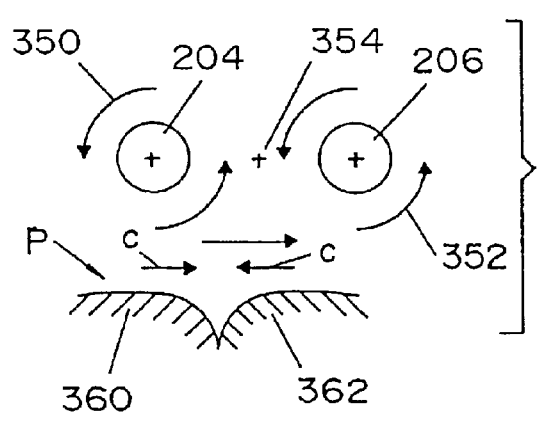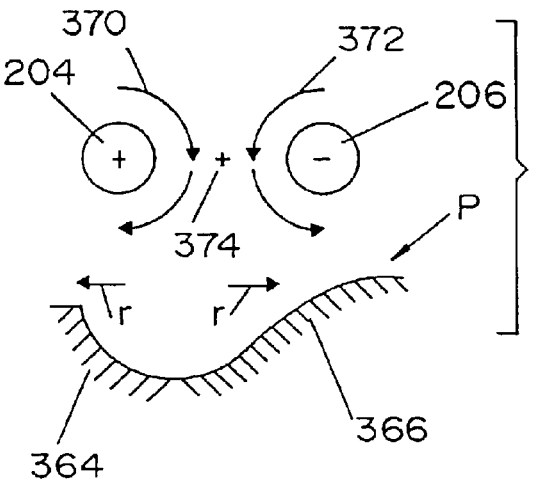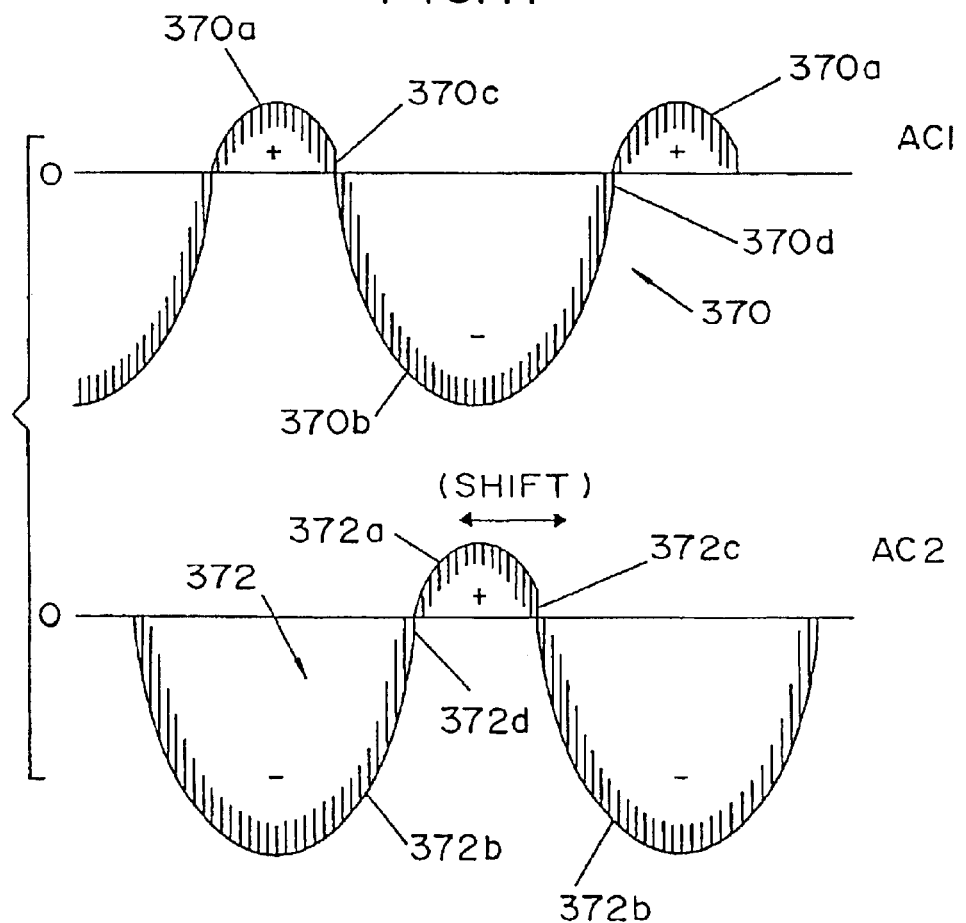

ELECTRIC ARC WELDING SYSTEM

The present invention relates to the art of electric arc welding and more particularly to an electric arc welding system to operate tandem electrodes.

INCORPORATION BY REFERENCE

The present invention is directed to an electric arc welding system utilizing high capacity alternating circuit power supplies for driving two or more tandem electrodes of the type used in seam welding of large metal blanks. Although the invention can be used with any standard AC power supply with switches for changing the output polarity, it is preferred that the power supplies use the switching concept disclosed in Stava U.S. Pat. No. 6,111,216 wherein the power supply is an inverter having two large output polarity switches with the arc current being reduced before the switches reverse the polarity. Consequently, the term "switching point" is a complex procedure whereby the power supply is first turned off awaiting a current less than a preselected value, such as 100 amperes. Upon reaching the 100 ampere threshold, the output switches of the power supply are reversed to reverse the polarity from the D.C. output link of the inverter. Thus, the "switching point" is an off output command, known as a "kill" command, to the power supply inverter followed by a switching command to reverse the output polarity. The kill output can be a drop to a decreased current level. This procedure is duplicated at each successive polarity reversal so the AC power supply reverses polarity only at a low current. In this manner, snubbing circuits for the output polarity controlling switches are reduced in size or eliminated. Since this switching concept is preferred to define the switching points as used in the present invention, Stava U.S. Pat. No. 6,111,216 is incorporated by reference. The concept of an AC current for tandem electrodes is well known in the art. U.S. Pat. No. 6,207,929 discloses a system whereby tandem electrodes are each powered by a separate inverter type power supply. The frequency is varied to reduce the interference between alternating current in the adjacent tandem electrodes. Indeed, this prior patent of assignee relates to single power sources for driving either a DC powered electrode followed by an AC electrode or two or more AC driven electrodes. In each instance, a separate inverter type power supply is used for each electrode and, in the alternating current high capacity power supplies, the switching point concept of Stava U.S. Pat. No. 6,111,216 is employed. This system for separately driving each of the tandem electrodes by a separate high capacity power supply is background information to the present invention and is incorporated herein as such background. In a like manner, U.S. Pat. No. 6,291,798 discloses a further arc welding system wherein each electrode in a tandem welding operation is driven by two or more independent power supplies connected in parallel with a single electrode arc. The system involves a single set of switches having two or more accurately balanced power supplies forming the input to the polarity reversing switch network operated in accordance with Stava U.S. Pat. No. 6,111,216. Each of the power supplies is driven by a single command signal and, therefore, shares the identical current value combined and directed through the polarity reversing switches. This type system requires large polarity reversing switches since all of the current to the electrode is passed through a single set of switches. U.S. Pat. No. 6,291,798 does show a master and slave combination of power supplies for a single electrode and discloses general background information to which the invention is directed. For that reason, this patent is also incorporated by reference. An improvement for operating tandem electrodes with controlled switching points is disclosed in Houston U.S. Pat. No. 6,472,634. This patent is incorporated by reference.

BACKGROUND OF INVENTION

Welding applications, such as pipe welding, often require high currents and use several arcs created by tandem electrodes. Such welding systems are quite prone to certain inconsistencies caused by arc disturbances due to magnetic interaction between two adjacent tandem electrodes. A system for correcting the disadvantages caused by adjacent AC driven tandem electrodes is disclosed in Stava U.S. Pat. No. 6,207,929. In that prior patent, each of the AC driven electrodes has its own inverter based power supply. The output frequency of each power supply is varied so as to prevent interference between adjacent electrodes. This system requires a separate power supply for each electrode. As the current demand for a given electrode exceeds the current rating of the inverter based power supply, a new power supply must be designed, engineered and manufactured. Thus, such system for operating tandem welding electrodes require high capacity or high rated power supplies to obtain high current as required for pipe welding. To decrease the need for special high current rated power supplies for tandem operated electrodes, assignee developed the system disclosed in Stava U.S. Pat. No. 6,291,798 wherein each AC electrode is driven by two or more inverter power supplies connected in parallel. These parallel power supplies have their output current combined at the input side of a polarity switching network. Thus, as higher currents are required for a given electrode, two or more parallel power supplies are used. In this system, each of the power supplies are operated in unison and share equally the output current. Thus, the current required by changes in the welding conditions can be provided only by the over current rating of a single unit. A current balanced system did allow for the combination of several smaller power supplies; however, the power supplies had to be connected in parallel on the input side of the polarity reversing switching network. As such, large switches were required for each electrode. Consequently, such system overcame the disadvantage of requiring special power supplies for each electrode in a tandem welding operation of the type used in pipe welding; but, there is still the disadvantage that the switches must be quite large and the input, paralleled power supplies must be accurately matched by being driven from a single current command signal. Stava U.S. Pat. No. 6,291,798 does utilize the concept of a synchronizing signal for each welding cell directing current to each tandem electrode. However, the system still required large switches. This type of system was available for operation in an ethernet network interconnecting the welding cells. In ethernet interconnections, the timing cannot be accurately controlled. In the system described, the switch timing for a given electrode need only be shifted on a time basis, but need not be accurately identified for a specific time. Thus, the described system requiring balancing the current and a single switch network has been the manner of obtaining high capacity current for use in tandem arc welding operations when using an ethernet network or an internet and ethernet control system. There is a desire to control welders by an ethernet network, with or without an internet link. Due to timing limitation, these networks dictated use of tandem electrode systems of the type using only general synchronizing techniques.

Such systems could be controlled by a network; however, the parameter to each paralleled power supply could not be varied. Each of the cells could only be offset from each other by a synchronizing signal. Such systems were not suitable for central control by the internet and/or local area network control because an elaborate network to merely provide offset between cells was not advantageous. Houston U.S. Pat. No. 6,472,634 discloses the concept of a single AC arc welding cell for each electrode wherein the cell itself includes one or more paralleled power supplies each of which has its own switching network. The output of the switching network is then combined to drive the electrode. This allows the use of relatively small switches for polarity reversing of the individual power supplies paralleled in the system. In addition, relatively small power supplies can be paralleled to build a high current input to each of several electrodes used in a tandem welding operation. The use of several independently controlled power supplies paralleled after the polarity switch network for driving a single electrode allows advantageous use of a network, such as the internet or ethernet.

In Houston U.S. Pat. No. 6,472,634, smaller power supplies in each system are connected in parallel to power a single electrode. By coordinating switching points of each paralleled power supply with a high accuracy interface, the AC output current is the sum of currents from the paralleled power supplies without combination before the polarity switches. By using this concept, the ethernet network, with or without an internet link, can control the weld parameters of each paralleled power supply of the welding system. The timing of the switch points is accurately controlled by the novel interface, whereas the weld parameters directed to the controller for each power supply can be provided by an ethernet network which has no accurate time basis. Thus, an internet link can be used to direct parameters to the individual power supply controllers of the welding system for driving a single electrode. There is no need for a time based accuracy of these weld parameters coded for each power supply. In the preferred implementation, the switch point is a "kill" command awaiting detection of a current drop below a minimum threshold, such as 100 amperes. When each power supply has a switch command, then they switch. The switch points between parallel power supplies, whether instantaneous or a sequence involving a "kill" command with a wait delay, are coordinated accurately by an interface card having an accuracy of less than 10 $\mu$s and preferably in the range of 1–5 $\mu$s. This timing accuracy coordinates and matches the switching operation in the paralleled power supplies to coordinate the AC output current.

By using the internet or ethernet local area network, the set of weld parameters for each power supply is available on a less accurate information network, to which the controllers for the paralleled power supplies are interconnected with a high accuracy digital interface card. Thus, the switching of the individual, paralleled power supplies of the system is coordinated. This is an advantage allowing use of the internet and local area network control of a welding system. The information network includes synchronizing signals for initiating several arc welding systems connected to several electrodes in a tandem welding operation in a selected phase relationship. Each of the welding systems of an electrode has individual switch points accurately controlled while the systems are shifted or delayed to prevent magnetic interference between different electrodes. This allows driving of several AC electrodes using a common information network. The Houston U.S. Pat. No. 6,472,634 system is especially useful for paralleled power supplies to power a given electrode with AC current. The switch points are coordinated by an accurate interface and the weld parameter for each paralleled power supply is provided by the general information network. This background is technology developed and patented by assignee and does not necessarily constitute prior art just because it is herein used as "background."

As a feature of the system in Stava U.S. Pat. No. 6,207,929, two or more power supplies can drive a single electrode. Thus, the system comprises a first controller for a first power supply to cause the first power supply to create an AC current between the electrode and workpiece by generating a switch signal with polarity reversing switching points in general timed relationship with respect to a given system synchronizing signal received by the first controller. This first controller is operated at first welding parameters in response to a set of first power supply specific parameter signals directed to the first controller. There is provided at least one slave controller for operating the slave power supply to create an AC current between the same electrode and workpiece by reversing polarity of the AC current at switching points. The slave controller operates at second weld parameters in response to the second set of power supply specific parameter signals to the slave controller. An information network connected to the first controller and the second or slave controller contains digital first and second power supply specific parameter signals for the two controllers and the system specific synchronizing signal. Thus, the controllers receive the parameter signals and the synchronizing signal from the information network, which may be an ethernet network with or without an internet link, or merely a local area network. The invention involves a digital interface connecting the first controller and the slave controller to control the switching points of the second or slave power supply by the switch signal from the first or master controller. In practice, the first controller starts a current reversal at a switch point. This event is transmitted at high accuracy to the slave controller to start its current reversal process. When each controller senses an arc current less than a given number, a "ready signal" is created. After a "ready" signal from all paralleled power supplies, all power supplies reverse polarity. This occurs upon receipt of a strobe or look command each 25 $\mu$s. Thus, the switching is in unison and has a delay of less than 25 $\mu$s. Consequently, both of the controllers have interconnected data controlling the switching points of the AC current to the single electrode. The same controllers receive parameter information and a synchronizing signal from an information network which in practice comprises a combination of internet and ethernet or a local area ethernet network. The timing accuracy of the digital interface is less than about 10 $\mu$s and, preferably, in the general range of 1–5 $\mu$s. Thus, the switching points for the two controllers driving a single electrode are commanded within less than 5 $\mu$s. Then, switching actually occurs within 25 $\mu$s. At the same time, relatively less time sensitive information is received from the information network also connected to the two controllers driving the AC current to a single electrode in a tandem welding operation. The 25 $\mu$s maximum delay can be changed, but is less than the switch command accuracy.

The unique control system disclosed in Houston U.S. Pat. No. 6,472,634 is used to control the power supply for tandem electrodes used primarily in pipe seam welding and disclosed in Stava U.S. Pat. No. 6,291,798. This Stava patent relates to a series of tandem electrodes movable along a welding path to lay successive welding beads in the space between the edges of a rolled pipe or the ends of two adjacent pipe sections. The individual AC waveforms used in this unique technology are created by a number of current pulses occurring at a frequency of at least 18 kHz with a magnitude of each current pulse controlled by a wave shaper. This technology dates back to Blankenship U.S. Pat. No. 5,278,390. Shaping of the waveforms in the AC currents of two adjacent tandem electrodes is known and is shown in not only the patents mentioned above, but in Stava U.S. Pat. No. 6,207,929. In this latter Stava patent, the frequency of the AC current at adjacent tandem electrodes is adjusted to prevent magnetic interference. All of these patented technologies by The Lincoln Electric Company of Cleveland, Ohio have been advances in the operation of tandem electrodes each of which is operated by a separate AC waveform created by the waveform technology set forth in these patents. These patents are incorporated by reference herein. However, these patents do not disclose the present invention which is directed to the use of such waveform technology for use in tandem welding by adjacent electrodes each using an AC current. This technology, as the normal transformer technology, has experienced difficulty in controlling the dynamics of the weld puddle. Thus, there is a need for an electric arc welding system for adjacent tandem electrodes which is specifically designed to control the dynamics and physics of the molten weld puddle during the welding operation. These advantages can not be obtained by merely changing the frequency to reduce the magnetic interference.

THE INVENTION

The present invention relates to an improvement in the waveform technology disclosed in Blankenship U.S. Pat. No. 5,278,390 and used for tandem electrode welding systems by several patents, including Stava U.S. Pat. No. 6,207,929; Stava U.S. Pat. No. 6,291,798; and, Houston U.S. Pat. No. 6,472,634. The improvement over this well developed technology is the control of the AC waveforms generated by adjacent tandem electrodes in a manner where the weld puddle is quiescent during the welding operation. This objective is accomplished by using a system that controls the relationship between the AC current of adjacent tandem electrodes to limit the time of concurrent polarity relationships, such as like polarity and opposite polarity, while obtaining a difference in penetration and deposition. It has been found that during the times of like polarity in the waveforms of two adjacent tandem electrodes the molten metal weld pool physically collapses whereas during opposite polarity of the waveforms for adjacent tandem electrodes the weld pool is repelled. If the adjacent AC pulses have a long time, exceeding 20 ms, with a concurrent polarity relationship, the collapsing or repelling action of the molten metal in the weld pool is disruptive to the welding process. The resulting weld bead that subsequently solidifies is not uniform. In using an AC current for adjacent electrodes, the invention assures that there is no long term concurrence of any one specific polarity relationship. This is one aspect of the invention. Another aspect of the invention is forming the waveform of an AC welding operation at each of the adjacent tandem electrodes where the waveforms are sinusoidal in one or both polarities. In the past, sinusoidal waveforms were created by transformers and not used in welding systems of the waveform technology type, as shown in the patents so far discussed and owned by Lincoln Electric. Consequently, another aspect of the invention is the creation of waveforms in an AC welding operation by the waveform technology utilizing a wave shaper and a pulse width modulator incorporated in the standard controller of a welder or obtained as a standard off the shelf pulse width modulator chip used in a controller for a welder. Consequently, the present invention relates to controlling the dynamics of the weld puddle by selection and creation of specific AC waveforms in adjacent tandem electrodes operated by the Lincoln waveform technology and the implementation of waveforms having sinusoidal configurations in either the positive or negative polarity and/or in both polarities. These two aspects of the invention are unique and allow operation of tandem electrodes with waveforms defining AC welding without agitation of the molten metal and obtaining the advantages of an AC waveform.

In accordance with the invention, an electric arc welding system is developed for creating a first AC welding arc with a first current waveform between a first electrode and a workpiece by a first power supply and a second AC welding arc with a second current waveform between a second electrode and a workpiece by a second power supply as the first and second electrodes are moved in unison. The tandem electrodes are each driven by an AC current having a created waveform with a specific shape. Creation of the waveform is by a power supply comprising a high speed switching inverter to create its waveform by a number of current pulses occurring at a frequency of at least 18 kHz with the magnitude of each of the current pulses controlled by a wave shaper and the polarity of the waveforms controlled by a logic signal. Each of the power supplies is the general type shown in various prior patents where the waveform across the electrode is controlled by a wave shaper. The switching between polarities is controlled by a signal, such as a logic signal, as disclosed in Houston U.S. Pat. No. 6,472,634. This type of power supply produces waveforms having a shape determined by a wave shaper, which is sometimes referred to as a waveform generator. The invention relates to this type of power supply used for tandem electrodes each of which is driven by an AC current.

In accordance with an aspect of the invention, at least the first AC waveform has a positive portion of substantially less energy than its negative portion and is phase shifted from the second AC waveform. Consequently, the penetration caused by the positive portion of the waveform employs a different energy than the deposition caused by the negative portion of the waveform. The waveforms are shifted so that the AC waveforms of adjacent tandem electrodes do not correspond and thus cause long periods of polarity concurrence, where either like polarity opposite polarities occur for a long time during the welding operation.

In accordance with still another aspect of the invention, the waveforms include sinusoidal shapes which are generated by a wave shaper utilizing a rapidly created series of current pulses. The sinusoidal current can be during the positive portion of the waveform, during the negative portion of the waveform or during both portions of the waveform. Heretofore tandem operation of electrodes each driven by an AC current of the type created by waveforms from a wave shaper have not created sinusoidal shapes nor limited the time of concurrent polarity relationships. These are advantages obtained by the present invention.

In accordance with still another aspect of the invention, the negative portion of one or more of the AC waveforms has substantially less energy than its positive portion. In this manner, the waveform is tailored to increase the penetration over the deposition by the waveform during the welding operation. The energy difference can be accomplished by increasing the maximum magnitude of either the positive or the negative portion of the waveform or by adjusting the time of the negative portion compared to the positive portion. Thus, energy control of the negative and positive polarity in the created waveform is either by magnitude or by time of one portion with respect to the other portion.

In accordance with another aspect of the present invention, the first AC waveform created by the wave shaper has a positive portion substantially different in length than the negative portion. This procedure accomplishes a trade off between penetration and deposition for use by adjacent tandem electrodes each operated by an AC current, wherein each current is created waveforms by a wave shaper or waveform generator.

Still a further aspect of the present invention is the provision of an electric arc welding system, as defined in the previous aspects, wherein the periods of concurrent polarity relationships defined as like polarities and opposite polarities are less than 20 ms. Preferably, these periods are less than the length of any one of the two waveforms. Preferably, the concurrent relationship is less than the length of time of one-half the time of a created waveform.

By using the present invention, the weld puddle is controlled and/or the AC currents for adjacent tandem electrodes can be formed into sinusoidal portions. This is the primary object of the present invention.

A further primary object of the present invention is the provision of an electric arc welding system for creating two AC welding arcs at adjacent tandem electrodes, which welding system limits the time when there is a concurrence of a specific polarity relationship.

Still another object of the present invention is the provision of an electric arc welding system, as defined above, which welding system utilizes the created sinusoidal wave shapes in either the positive, negative or both portions of the created waveforms.

Yet another object of the present invention is the provision of an electric arc welding system, as defined above, which system controls the dynamics of the weld puddle to prevent puddle agitation and obtain a uniform weld bead.

Still a further object of the present invention is the provision of an electric arc welding system, as defined above, which system utilizes waveform technology while obtaining the advantages of weld puddle control as well as a sinusoidal profile for the created waveforms.

These and other objects and advantages will become apparent from the following description taken together with the accompanying drawings.

BRIEF DESCRIPTION OF DRAWINGS

FIGS. 9 and 10 are schematic drawings illustrating the dynamics of the weld puddle during concurrent polarity relationships of tandem electrodes to explain the advantage of the present invention;

FIG. 11 is a pair of current graphs showing the waveforms on two adjacent tandem electrodes employing the present invention;

PREFERRED EMBODIMENT

Figure 1:
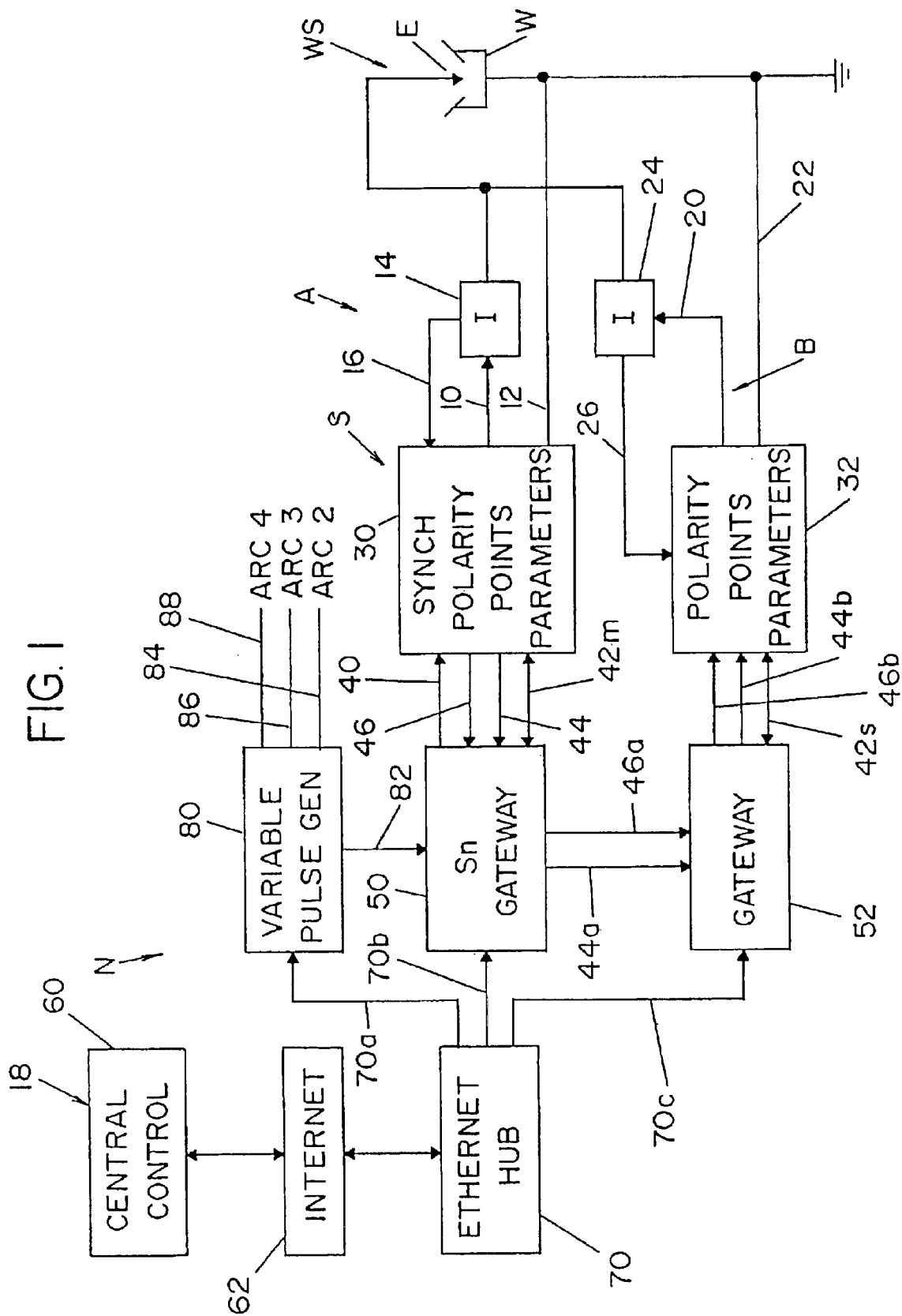
FIG. 1 is a block diagram of the preferred embodiment of the present invention.
Figure 2:
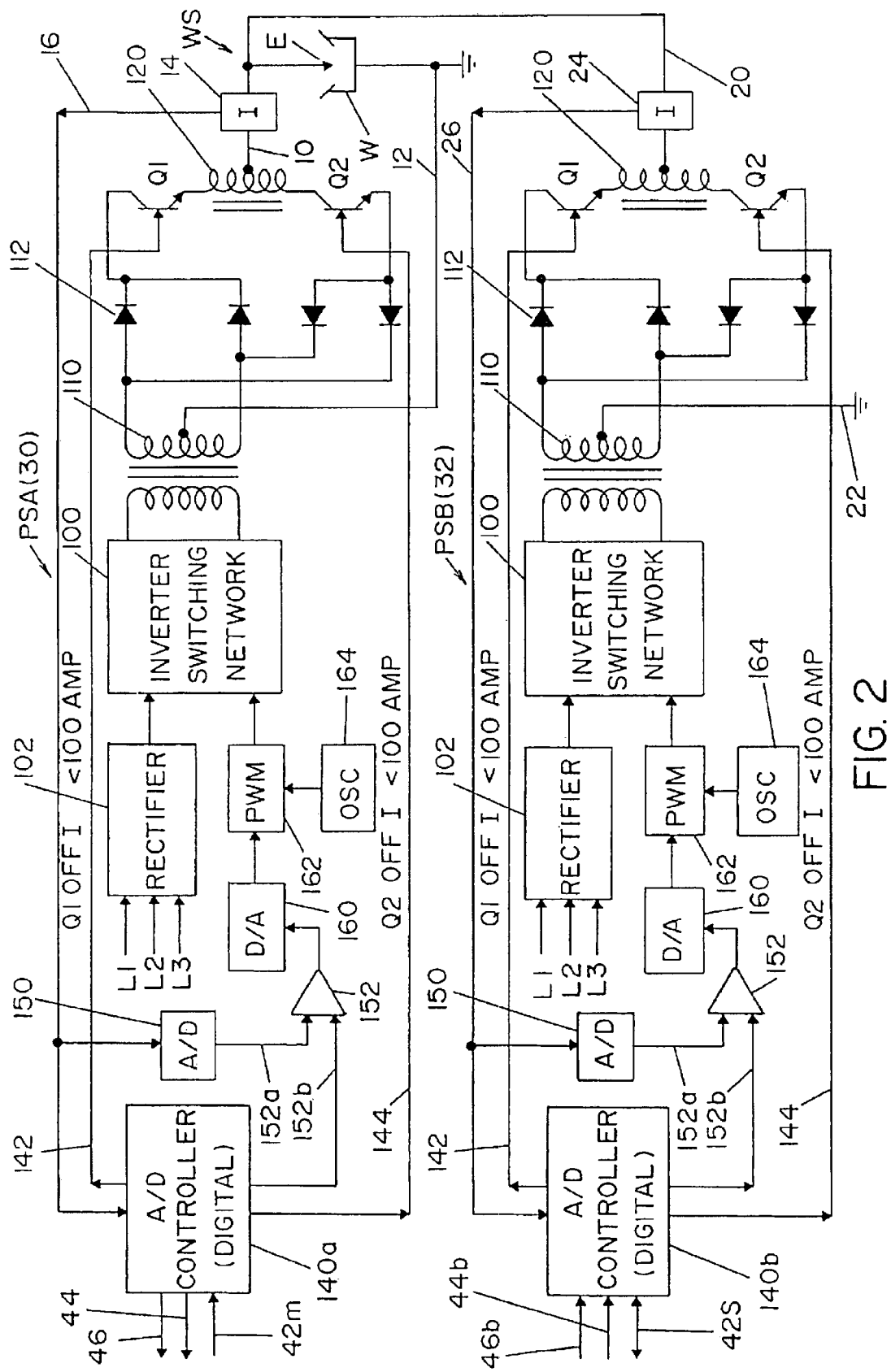
FIG. 2 is a wiring diagram of two paralleled power supplies, each of which include a switching output which power supplies are used in practicing the invention.
Figure 5:
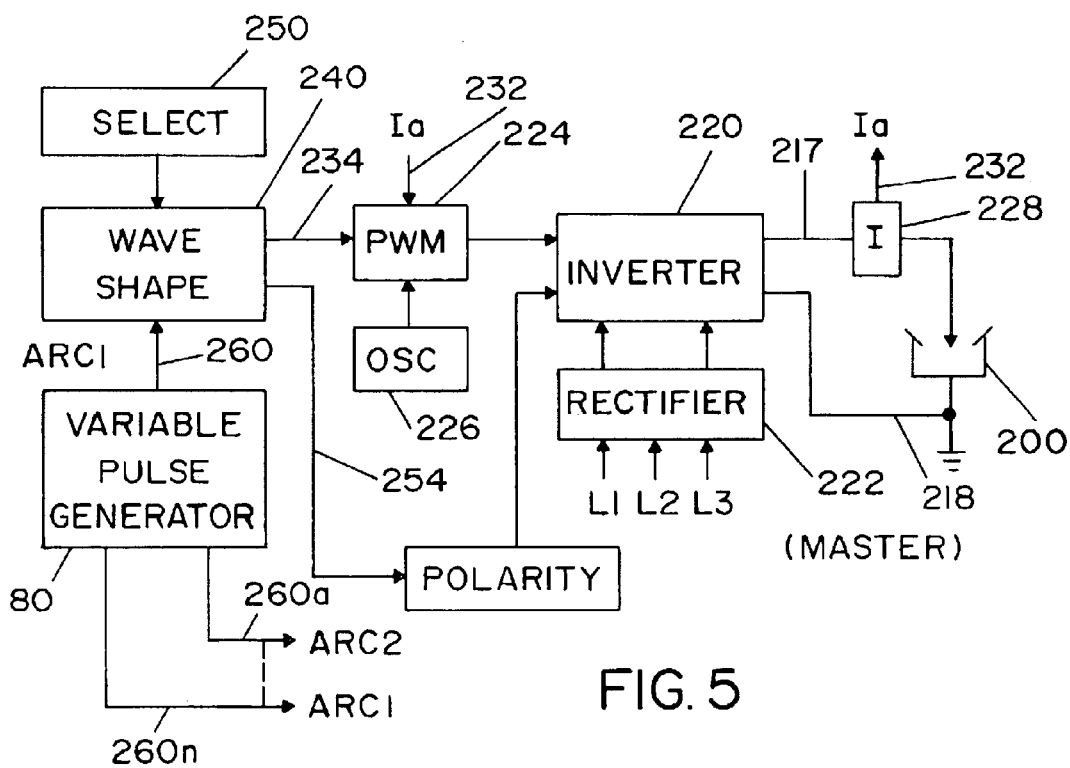
FIG. 5 is a block diagram showing a single electrode driven by the system as shown in FIG. 4 with a variable pulse generator disclosed in Houston U.S. Pat. No. 6,472,634.
Figure 16:
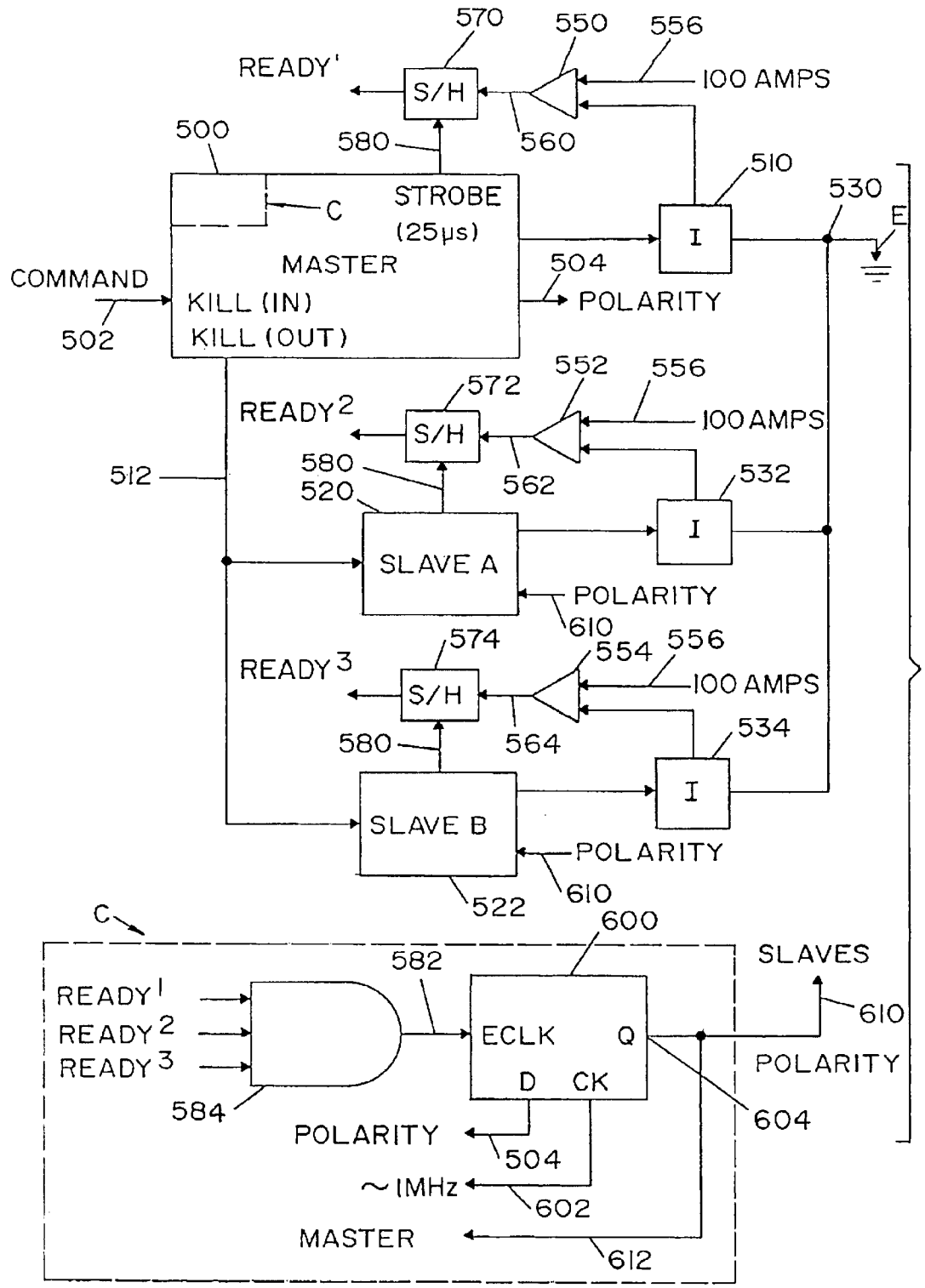

Referring now to the drawings wherein the showings are for the purpose of illustrating a preferred embodiment of the invention only and not for the purpose of limiting same, the system for implementing the invention is shown in detail in FIGS. 1, 2 and 16. In FIG. 1 there is a single electric arc welding system S in the form of a single cell to create an alternating current as an arc at weld station WS. This system or cell includes a first master welder A with output leads 10, 12 in series with electrode E and workpiece W in the form of a pipe seam joint or other welding operation. Hall effect current transducer 14 provides a voltage in line 16 proportional to the current of welder A. Less time critical data, such as welding parameters, are generated at a remote central control 18. In a like manner, a slave following welder B includes leads 20, 22 connected in parallel with leads 10, 12 to direct an additional AC current to the weld station WS. Hall effect current transducer 24 creates a voltage in line 26 representing current levels in welder B during the welding operation. Even though a single slave or follower welder B is shown, any number of additional welders can be connected in parallel with master welder A to produce an alternating current across electrode E and workpiece W. The AC current is combined at the weld station instead of prior to a polarity switching network. Each welder includes a controller and inverter based power supply illustrated as a combined master controller and power supply 30 and a slave controller and power supply 32. Controllers 30, 32 receive parameter data and synchronization data from a relatively low level logic network. The parameter information or data is power supply specific whereby each of the power supplies is provided with the desired parameters such as current, voltage and/or wire feed speed. A low level digital network can provide the parameter information; however, the AC current for polarity reversal occurs at the same time. The "same" time indicates a time difference of less than 10 $\mu$s and preferably in the general range of 1–5 $\mu$s. To accomplish precise coordination of the AC output from power supply 30 and power supply 32, the switching points and polarity information can not be provided from a general logic network wherein the timing is less precise. The individual AC power supplies are coordinated by high speed, highly accurate DC logic interface referred to as "gateways." As shown in FIG. 1, power supplies 30, 32 are provided with the necessary operating parameters indicated by the bi-directional leads 42m, 42s, respectively. This non-time sensitive information is provided by a digital network shown in FIG. 1. Master power supply 30 receives a synchronizing signal as indicated by unidirectional line 40 to time the controllers operation of its AC output current. The polarity of the AC current for power supply 30 is outputted as indicated by line 46. The actual switching command for the AC current of master power supply 30 is outputted on line 44. The switch command tells power supply S, in the form of an inverter, to "kill," which is a drastic reduction of current. In an alternative, this is actually a switch signal to reverse polarity. The "switching points" or command on line 44 preferably is a "kill" and current reversal commands utilizing the "switching points" as set forth in Stava U.S. Pat. No. 6,111,216. Thus, timed switching points or commands are outputted from power supply 30 by line 44. These switching points or commands may involve a power supply "kill" followed by a switch ready signal at a low current or merely a current reversal point. The switch "ready" is used when the "kill" concept is implemented because neither inverters are to actually reverse until they are below the set current. This is described in FIG. 16. The polarity of the switches of controller 30 controls the logic on line 46. Slave power supply 32 receives the switching point or command logic on line 44b and the polarity logic on line 46b. These two logic signals are interconnected between the master power supply and the slave power supply through the highly accurate logic interface shown as gateway 50, the transmitting gateway, and gateway 52, the receiving gateway. These gateways are network interface cards for each of the power supplies so that the logic on lines 44b, 46b are timed closely to the logic on lines 44, 46, respectively. In practice, network interface cards or gateways 50, 52 control this logic to within 10 μs and preferably within 1–5 μs. A low accuracy network controls the individual power supplies for data from central control 18 through lines 42m, 42s, illustrated as provided by the gateways or interface cards. These lines contain data from remote areas (such as central control 18) which are not time sensitive and do not use the accuracy characteristics of the gateways. The highly accurate data for timing the switch reversal uses interconnecting logic signals through network interface cards 50, 52. The system in FIG. 1 is a single cell for a single AC arc; however, the invention is directed to tandem electrodes wherein two or more AC arcs are created to fill the large gap found in pipe welding. Thus, the master power supply 30 for the first electrode receives a synchronization signal which determines the timing or phase operation of the system S for a first electrode, i.e. ARC 1. System S is used with other identical systems to generate ARCs 2, 3, and 4 timed by synchronizing outputs 84, 86 and 88. This concept is schematically illustrated in FIG. 5. The synchronizing or phase setting signals 82–88 are shown in FIG. 1 with only one of the tandem electrodes. An information network N comprising a central control computer and/or web server 60 provides digital information or data relating to specific power supplies in several systems or cells controlling different electrodes in a tandem operation. Internet information is directed to a local area network in the form of an ethernet network 70 having local interconnecting lines 70a, 70b, 70c. Similar interconnecting lines are directed to each power supply used in the four cells creating ARCs 1, 2, 3 and 4 of a tandem welding operation. The description of system or cell S applies to each of the arcs at the other electrodes. If AC current is employed, a master power supply is used. In some instances, merely a master power supply is used with a cell specific synchronizing signal. If higher currents are required, the systems or cells include a master and slave power supply combination as described with respect to system S of FIG. 1. In some instances, a DC arc is used with two or more AC arcs synchronized by generator 80. Often the DC arc is the leading electrode in a tandem electrode welding operation, followed by two or more synchronized AC arcs. A DC power supply need not be synchronized, nor is there a need for accurate interconnection of the polarity logic and switching points or commands. Some DC powered electrodes may be switched between positive and negative, but not at the frequency of an AC driven electrode. Irrespective of the make-up of the arcs, ethernet or local area network 70 includes the parameter information identified in a coded fashion designated for specific power supplies of the various systems used in the tandem welding operation. This network also employs synchronizing signals for the several cells or systems whereby the systems can be offset in a time relationship. These synchronizing signals are decoded and received by a master power supply as indicated by line 40 in FIG. 1. In this manner, the AC arcs are offset on a time basis. These synchronizing signals are not required to be as accurate as the switching points through network interface cards or gateways 50, 52. Synchronizing signals on the data network are received by a network interface in the form of a variable pulse generator 80. The generator creates offset synchronizing signals in lines 84, 86 and 88. These synchronizing signals dictate the phase of the individual alternating current cells for separate electrodes in the tandem operation. Synchronizing signals can be generated by interface 80 or actually received by the generator through the network 70. In practice, network 70 merely activates generator 80 to create the delay pattern for the many synchronizing signals. Also, generator 80 can vary the frequency of the individual cells by frequency of the synchronizing pulses if that feature is desired in the tandem welding operation.

A variety of controllers and power supplies could be used for practicing the system as described in FIG. 1; however, preferred implementation of the system is set forth in FIG. 2 wherein power supply PSA is combined with controller and power supply 30 and power supply PSB is combined with controller and power supply 32. These two units are essentially the same in structure and are labeled with the same numbers when appropriate. Description of power supply PSA applies equally to power supply PSB. Inverter 100 has an input rectifier 102 for receiving three phase line current L1, L2, and L3. Output transformer 110 is connected through an output rectifier 112 to tapped inductor 120 for driving opposite polarity switches Q1, Q2. Controller 140a of power supply PSA and controller 140b of PSB are essentially the same, except controller 140a outputs timing information to controller 140b. Switching points or lines 142, 144 control the conductive condition of polarity switches Q1, Q2 for reversing polarity at the time indicated by the logic on lines 142, 144, as explained in more detail in Stava U.S. Pat. No. 6,111,216 incorporated by reference herein. The control is digital with a logic processor; thus, A/D converter 150 converts the current information on feedback line 16 or line 26 to controlling digital values for the level of output from error amplifier 152 which is illustrated as an analog error amplifier. In practice, this is a digital system and there is no further analog signal in the control architecture. As illustrated, however, amplifier has a first input 152a from converter 150 and a second input 152b from controller 140a or 140b. The current command signal on line 152b includes the wave shape or waveform required for the AC current across the arc at weld station WS. This is standard practice as taught by several patents of Lincoln Electric, such as Blankenship U.S. Pat. No. 5,278,390, incorporated by reference. See also Stava U.S. Pat. No. 6,207,929, incorporated by reference. The output from amplifier 152 is converted to an analog voltage signal by converter 160 to drive pulse width modulator 162 at a frequency controlled by oscillator 164, which is a timer program in the processor software. The shape of the waveform at the arcs is the voltage or digital number at lines 152b. The frequency of oscillator 164 is greater than 18 kHz. The total architecture of this system is digitized in the preferred embodiment of the present invention and does not include reconversion back into analog signal. This representation is schematic for illustrative purposes and is not intended to be limiting of the type of power supply used in practicing the present invention. Other power supplies could be employed.

Figure 3:
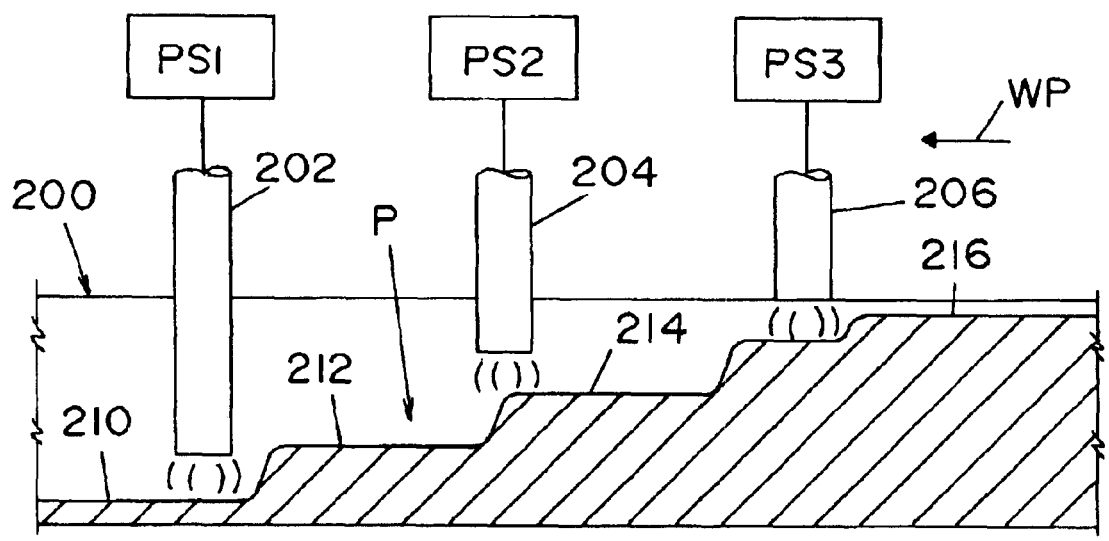
FIG. 3 is a cross sectional side view of three tandem electrodes operated in accordance with the present invention for welding the seam of a pipe.
Figure 4:
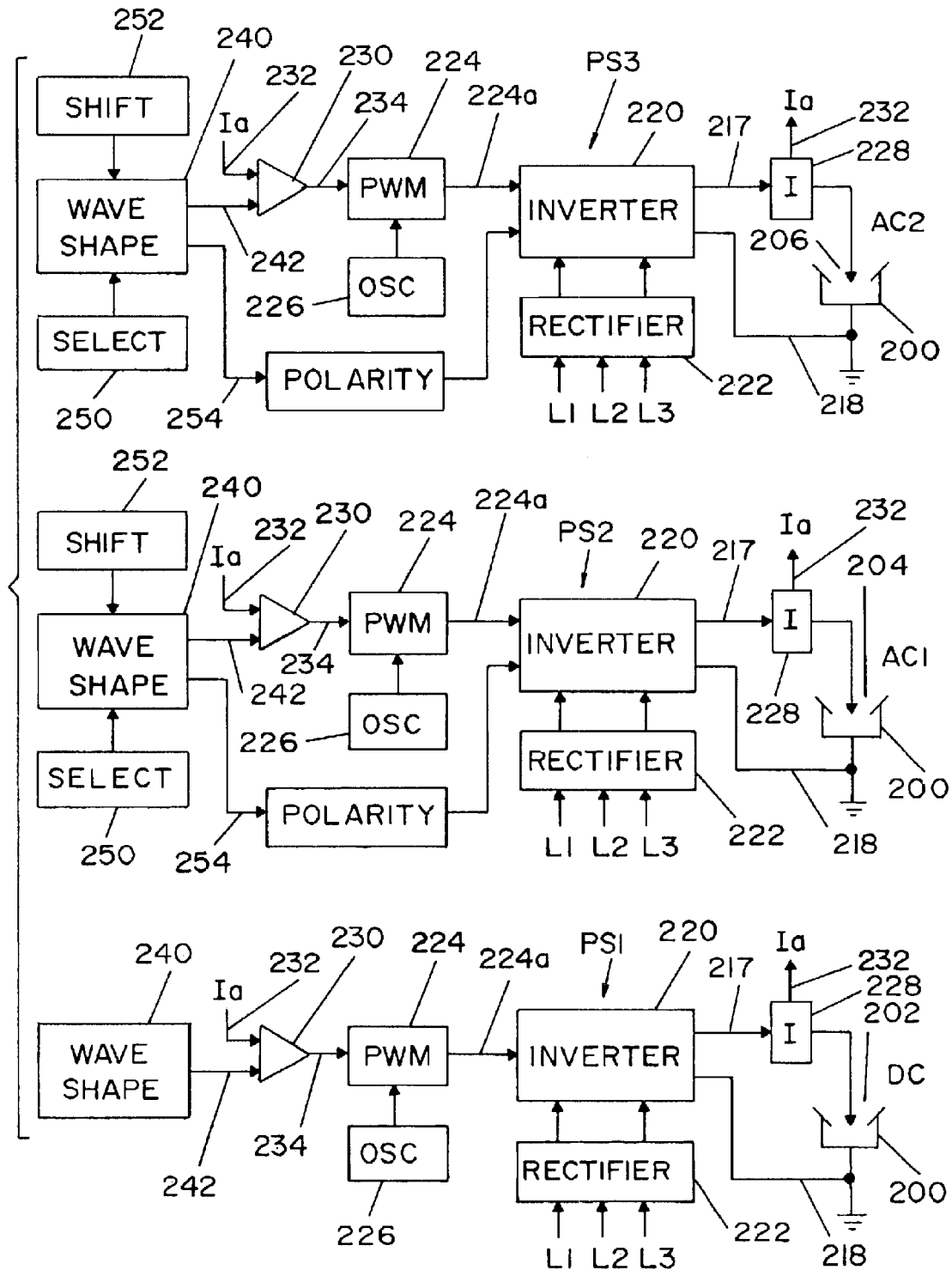
FIG. 4 is a schematic layout in block form of a welding system for three electrodes using the disclosure in Houston U.S. Pat. No. 6,472,634 and Stava U.S. Pat. No. 6,291,798.
Figure 7:
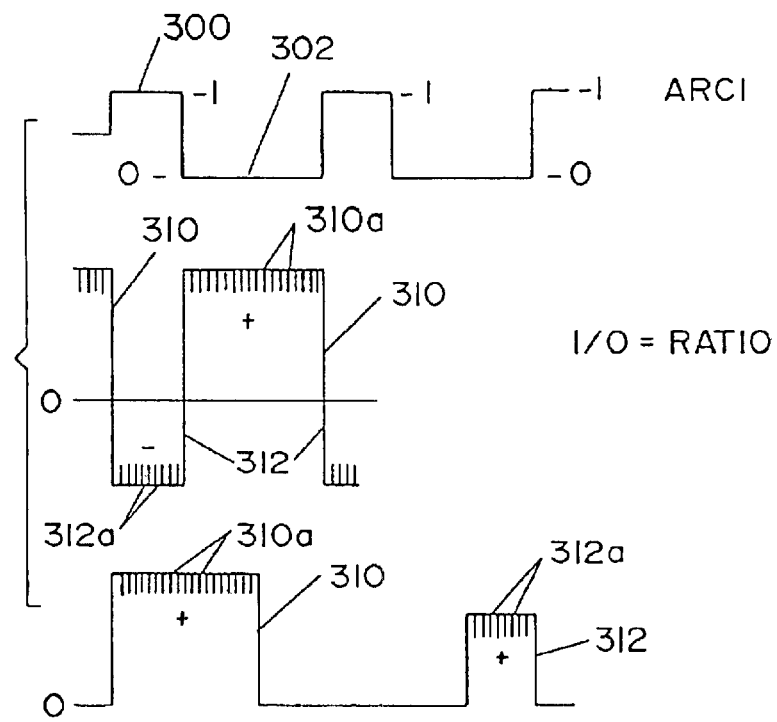
FIG. 7 is a current graph superimposed upon a signal having logic to determine the polarity of the waveform as used in practicing the present invention.

The practice of the present invention utilizing the concepts of FIGS. 1 and 2 are illustrated in FIGS. 3 and 4. Workpiece 200 is a seam in a pipe which is welded together by tandem electrodes 202, 204 and 206 powered by individual power supplies PS1, PS2, PS3, respectively. The power supplies can include more than one power source coordinated in accordance with the technology in Houston U.S. Pat. No. 6,472,634. The illustrated embodiment involves a DC arc for lead electrode 202 and an AC arc for each of the tandem electrodes 204, 206. The created waveforms of the tandem electrodes are AC currents and include shapes created by a wave shaper or wave generator in accordance with the previously described waveform technology. As electrodes 202, 204 and 206 are moved along weld path WP a molten metal puddle P is deposited in pipe seam 200 with an open root portion 210 followed by deposits 212, 214 and 216 from electrodes 202, 204 and 206, respectively. As previously described more than two AC driven electrodes as will be described and illustrated by the waveforms of FIG. 15, can be operated by the invention relating to AC currents of adjacent electrodes. The power supplies, as shown in FIG. 4, each include an inverter 220 receiving a DC link from rectifier 222. In accordance with Lincoln waveform technology, a chip or internal programmed pulse width modulator stage 224 is driven by an oscillator 226 at a frequency greater than 18 kHz and preferably greater than 20 kHz. As oscillator 226 drives pulse width modulator 224, the output current has a shape dictated by the wave shape outputted from wave shaper 240 as a voltage or digital numbers at line 242. The shape in real time is compared with the actual arc current in line 232 by a stage illustrated as comparator 230 so that the outputs on line 234 controls the shape of the AC waveforms. The digital number or voltage on line 234 determines the output signal on line 224a to control inverter 220 so that the waveform of the current at the arc follows the selected profile outputted from wave shaper 240. This is standard Lincoln waveform technology, as previously discussed. Power supply PS1 creates a DC arc at lead electrode 202; therefore, the output from wave shaper 240 of this power supply is a steady state indicating the magnitude of the DC current. The present invention does not relate to the formation of a DC arc. To the contrary, the present invention is the control of the current at two adjacent AC arcs for tandem electrodes, such as electrodes 204, 206. In accordance with the invention, wave shaper 240 involves an input 250 employed to select the desired shape or profile of the AC waveform. This shape can be shifted in real time by an internal programming schematically represented as shift program 252. Wave shaper 240 has an output which is a priority signal on line 254. In practice, the priority signal is a bit of logic, as shown in FIG. 7. Logic 1 indicates a negative polarity for the waveform generated by wave shaper 240 and logic 0 indicates a positive polarity. This logic signal or bit controller 220 directed to the power supply is read in accordance with the technology discussed in FIG. 16. The inverter switches from a positive polarity to a negative polarity, or the reverse, at a specific "READY" time initiated by a change of the logic bit on line 254. In practice, this bit is received from variable pulse generator 80 shown in FIG. 1 and in FIG. 5. The welding system shown in FIGS. 3 and 4 is used in practicing the invention wherein the shape of AC arc currents at electrodes 204 and 206 have novel shapes to obtain a beneficial result of the present invention, i.e. a generally quiescent molten metal puddle P and/or synthesized sinusoidal waveforms compatible with transformer waveforms used in arc welding. The electric arc welding system shown in FIGS. 3 and 4 have a program to select the waveform at "SELECT" program 250 for wave shaper 240. In this manner the unique waveforms of the present invention are used by the tandem electrodes. One of the power supplies to create an AC arc is schematically illustrated in FIG. 5. The power supply or source is controlled by variable pulse generator 80, shown in FIG. 1. Signal 260 from the generator controls the power supply for the first arc. This signal includes the synchronization of the waveform together with the polarity bit outputted by the wave shaper 240 on line 254. Lines 260a–260n control the desired subsequent tandem AC arcs operated by the welding system of the present invention. The timing of these signals shifts the start of the other waveforms. FIG. 5 merely shows the relationship of variable pulse generator 80 to control the successive arcs as explained in connection with FIG. 4.

Figure 6:
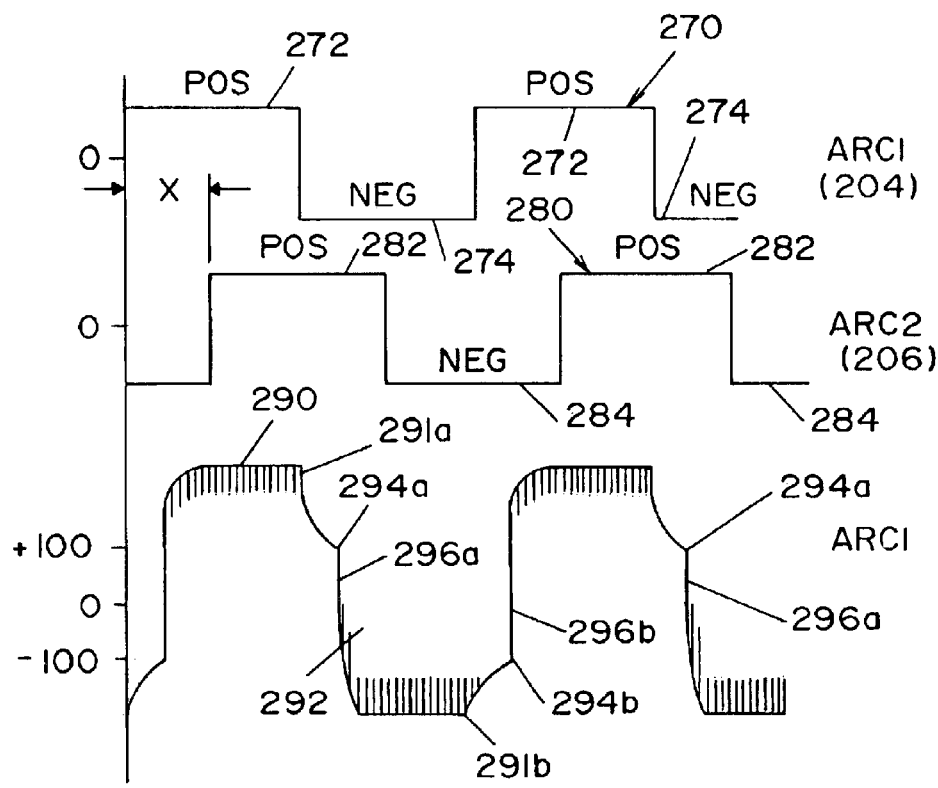
FIG. 6 is a current graph for one of two illustrated synchronizing pulses and showing a balanced AC waveform for one tandem electrode.
Figure 8:
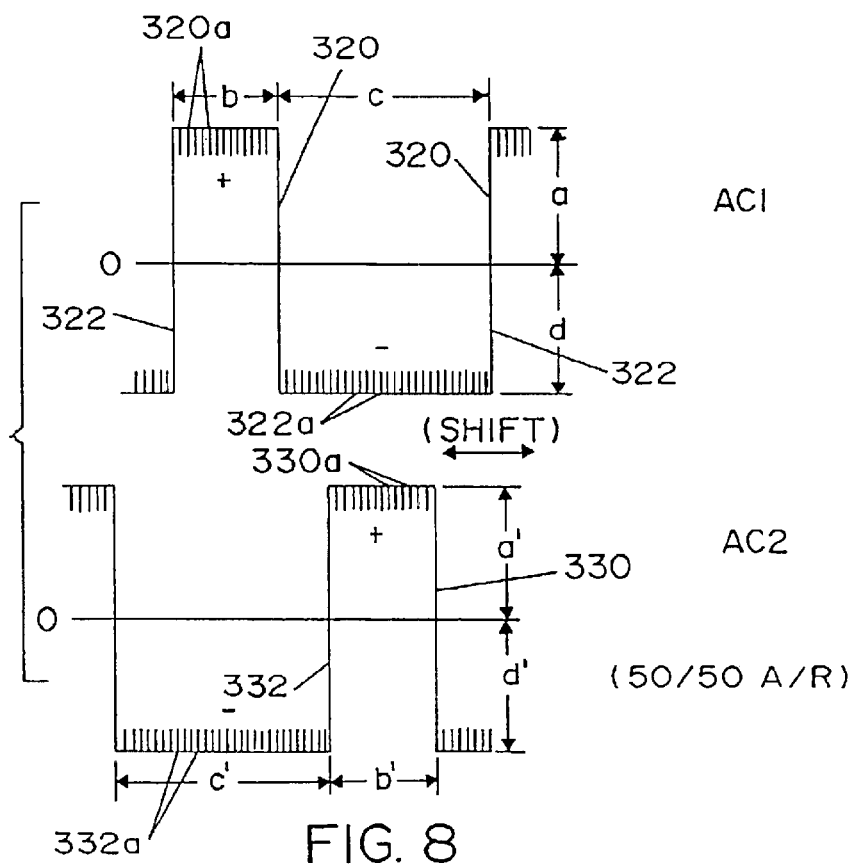
FIG. 8 is a current graph showing a broad aspect of the preferred embodiment of the present invention.

In the welding system of Houston U.S. Pat. No. 6,472,634, the AC waveforms are created as shown in FIG. 6 wherein the wave shaper for arc AC1 at electrode 204 creates a signal 270 having positive portions 272 and negative portions 274. The second arc AC2 at electrode 206 is controlled by signal 280 from the wave shaper having positive portions 282 and negative portions 284. These two signals are the same, but are shifted by the signal from generator 80 a distance x, as shown in FIG. 6. The waveform technology created current pulses or waveforms at one of the arcs are waveforms having positive portions 290 and negative portions 292 shown at the bottom portion of FIG. 6. A logic bit from the wave shaper determines when the waveform is switched from the positive polarity to the negative polarity and the reverse. In accordance with the disclosure in Stava U.S. Pat. No. 6,111,216 (incorporated by reference herein) pulse width modulator 224 is generally shifted to a lower level at point 291a and 291b. Then the current reduces until reaching a fixed level, such as 100 amps. Consequently, the switches change polarity at points 294a and 294b. This produces a vertical line or shape 296a, 296b when current transitioning between positive portion 290 and negative portion 292. This is the system disclosed in the Houston patent where the like waveforms are shifted to avoid magnetic interference. The waveform portions 290,292 are the same at arc AC1 and at arc AC2. This is different from the present invention which relates to customizing the waveforms at arc AC1 and arc AC2 for purposes of controlling the molten metal puddle and/or synthesizing a sinusoidal wave shape in a manner not heretofore employed. The disclosure of FIG. 6 is set forth to show the concept of shifting the waveforms, but not the invention which is customizing each of the adjacent waveforms. The same switching procedure to create a vertical transition between polarities is used in the preferred embodiment of the present invention. Converting from the welding system shown in FIG. 6 to the present invention is generally shown in FIG. 7. The logic on line 254 is illustrated as being a logic 1 in portions 300 and a logic 0 in portions 302. The change of the logic or bit numbers signals the time when the system illustrated in FIG. 16 shifts polarity. This is schematically illustrated in the lower graph of FIG. 6 at points 294a, 294b. In accordance with the invention, wave shaper 240 for each of the adjacent AC arcs has a first wave shape 310 for one of the polarities and a second wave shape 312 for the other polarity. Each of the waveforms 310, 312 are created by the logic on line 234 taken together with the logic on line 254. Thus, pulses 310, 312 as shown in FIG. 7, are different pulses for the positive and negative polarity portions. Each of the pulses 310, 312 are created by separate and distinct current pulses 310a, 312a as shown. Switching between polarities is accomplished as illustrated in FIG. 6 where the waveforms generated by the wave shaper are shown as having the general shape of waveforms 310, 312. Positive polarity controls penetration and negative polarity controls deposition. In accordance with the invention, the positive and negative pulses of a waveform are different and the switching points are controlled so that the AC waveform at one arc is controlled both in the negative polarity and the positive polarity to have a specific shape created by the output of wave shaper 240. The waveforms for the arc adjacent to the arc having the current shown in FIG. 7 is controlled differently to obtain the advantages of the present invention. This is illustrated best in FIG. 8. The waveform at arc AC1 is in the top part of FIG. 8. It has positive portions 320 shown by current pulses 320a and negative portions 322 formed by pulses 322a. Positive portion 320 has a maximum magnitude a and width or time period b. Negative portion 322 has a maximum magnitude d and a time or period c. These four parameters are adjusted by wave shaper 240. In the illustrated embodiment, arc AC2 has the waveform shown at the bottom of FIG. 8 where positive portion 330 is formed by current pulses 330a and has a height or magnitude a' and a time length or period b'. Negative portion 332 is formed by pulses 332a and has a maximum amplitude b' and a time length c'. These parameters are adjusted by wave shaper 240. In accordance with the invention, the waveform from the wave shaper on arc AC1 is out of phase with the wave shape for arc AC2. The two waveforms have parameters or dimensions which are adjusted so that (a) penetration and deposition is controlled and (b) there is no long time during which the puddle P is subjected to a specific polarity relationship, be it a like polarity or opposite polarity. This concept in formulating the wave shapes prevents long term polarity relationships as explained by the showings in FIGS. 9 and 10. In FIG. 9 electrodes 204, 206 have like polarity, determined by the waveforms of the adjacent currents at any given time. At that instance, magnetic flux 350 of electrode 204 and magnetic flux 352 of electrode 206 are in the same direction and cancel each other at center area 354 between the electrodes. This causes the molten metal portions 360, 362 from electrodes 204, 206 in the molten puddle P to move together, as represented by arrows c. This inward movement together or collapse of the molten metal in puddle P between electrodes 204 will ultimately cause an upward gushing action, if not terminated in a very short time, i.e. less than about 20 ms. As shown in FIG. 10, the opposite movement of the puddle occurs when the electrodes 204, 206 have opposite polarities. Then, magnetic flux 370 and magnetic flux 372 are accumulated and increased in center portion 374 between the electrodes. High forces between the electrodes causes the molten metal portions 364, 366 of puddle P to retract or be forced away from each other. This is indicated by arrows r. Such outward forcing of the molten metal in puddle P causes disruption of the weld bead if it continues for a substantial time which is generally less than 10 ms. As can be seen from FIGS. 9 and 10, it is desirable to limit the time during which the polarity of the waveform at adjacent electrodes is either the same polarity or opposite polarity. The present invention utilizes the waveform, such as shown in FIG. 6, to accomplish this objective of preventing long term concurrence of specific polarity relationships, be it like polarities or opposite polarities. Both of these relationships are detrimental to quality welding and are avoided when using the present invention. As shown in FIG. 8, like polarity and opposite polarity is retained for a very short time less than the cycle length of the waveforms at arc AC1 and arc AC2. This positive development of preventing long term occurrence of polarity relationships together with the novel concept of pulses having different shapes and different proportions in the positive and negative areas combine to control the puddle, control penetration and control deposition in a manner not heretofore obtainable in welding with a normal transformer power supplies or normal use of Lincoln waveform technology.

An implementation of the present invention is shown in FIG. 11 wherein the positive and negative portions of the AC waveform from the wave shaper 240 are synthesized sinusoidal shapes with a different energy in the positive portion as compared to the negative portion of the waveforms. The synthesized sine wave or sinusoidal portions of the waveforms is novel. It allows the waveforms to be compatible with transformer welding circuits and compatible with evaluation of sine wave welding. In FIG. 11, waveform 370 is at arc AC1 and waveform 372 is at arc AC2. These tandem arcs utilize the AC welding current shown in FIG. 11 wherein a small positive sinusoidal portion 370a controls penetration at arc AC1 while the larger negative portion 370b controls the deposition of metal at arc AC1. There is a switching between the polarities with a change in the logic bit, as discussed in FIG. 7. Sinusoidal waveform 370 plunges vertically from approximately 100 amperes through zero current as shown in by vertical line 370c. Transition between the negative portion 370b and positive portion 370a also starts a vertical transition at the switching point causing a vertical transition 370d. In a like manner, phase shifted waveform 372 of arc AC2 has a small penetration portion 372a and a large negative deposition portion 372b. Transition between polarities is indicated by vertical lines 372c and 372d. Waveform 372 is shifted with respect to waveform 370 so that the dynamics of the puddle are controlled without excessive collapsing or repulsion of the molten metal in the puddle caused by polarities of adjacent arcs AC1, AC2. In the embodiment shown in FIG. 11, the sine wave shapes are the same and the frequencies are the same. They are merely shifted to prevent a long term occurrence of a specific polarity relationship.

Figure 12:
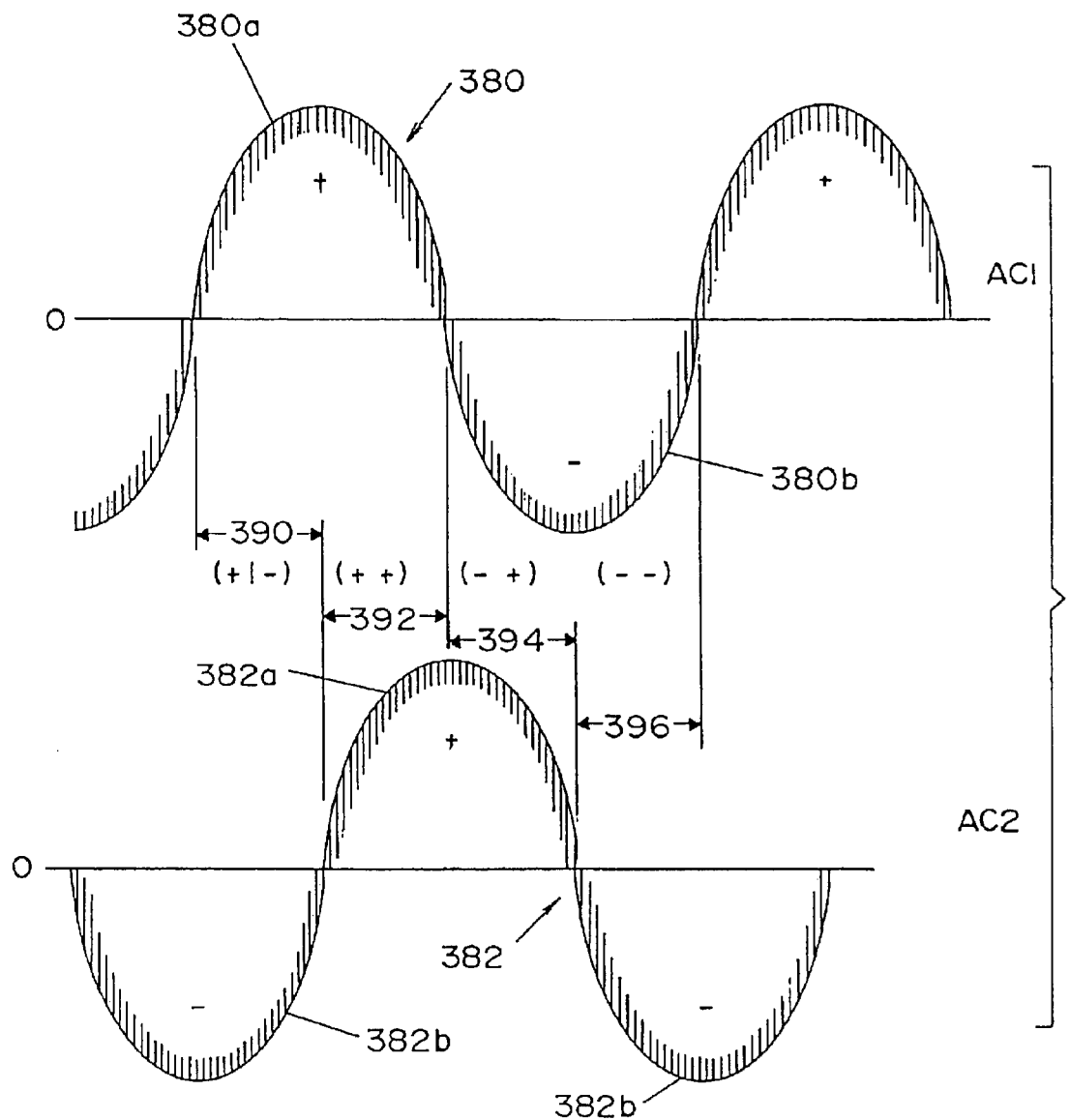
FIG. 12 is a pair of current graphs of the AC waveforms on adjacent tandem electrodes with areas of concurring polarity relationships.
Figure 13:
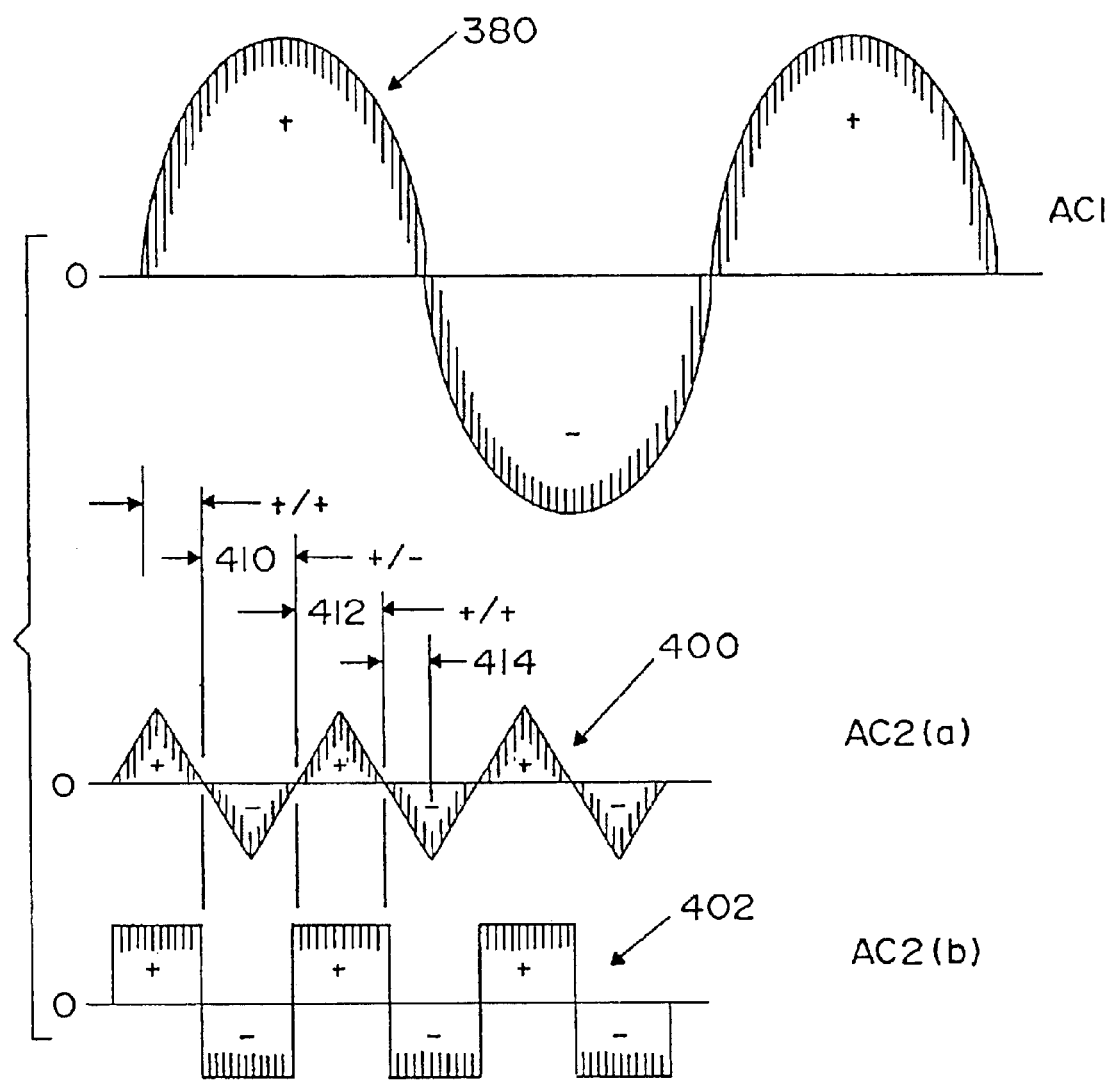
FIG. 13 are current graphs of the waveforms on adjacent tandem electrodes wherein the AC waveform of one electrode is substantially different waveform of the other electrode to limit the time of concurrent polarity relationships.
Figure 14:
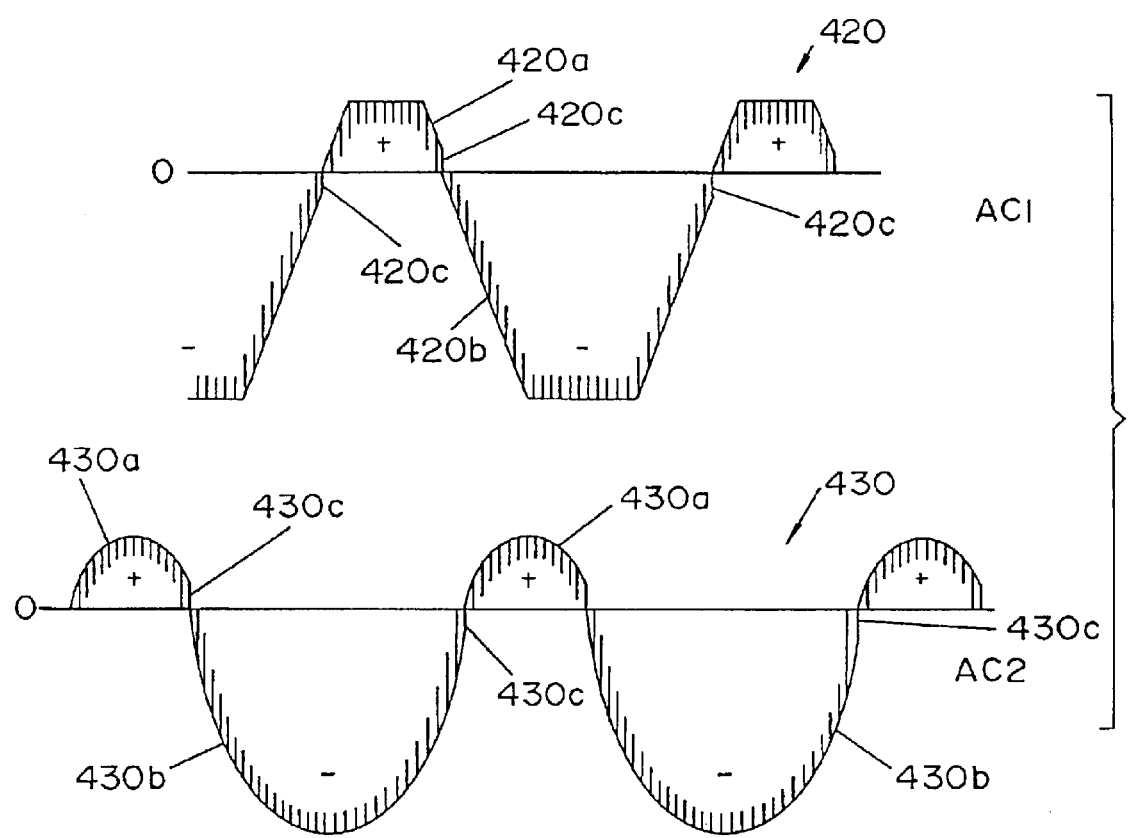
FIG. 14 are current graphs of two sinusoidal waveforms for adjacent electrodes operated by a system in accordance with the present invention to use different shaped wave forms for the adjacent electrodes.

Another aspect of the invention is schematically illustrated in FIG. 12 wherein waveform 380 is used for arc AC1 and waveform 372 is used for arc AC2. Portions 380a, 380b, 382a, and 382b are sinusoidal synthesized and are illustrated as being of the same general magnitude. By shifting these two waveforms 90°, areas of concurrent polarity are identified as areas 390, 392, 394 and 396. By using the shifted waveforms with sinusoidal profiles, like polarities or opposite polarities do not remain for any length of time. Thus, the molten metal puddle is not agitated and remains quiescent. This advantage is obtained by using the present invention which also combines the concept of a difference in energy between the positive and negative polarity portions of a given waveform. FIG. 12 is illustrative in nature to show the definition of concurrent polarity relationships and the fact that they should remain for only a short period of time. To accomplish this objective, another embodiment of the present invention is illustrated in FIG. 13 wherein previously defined waveform 380 is combined with waveform 400, shown as the sawtooth waveform of arc AC2(a) or the pulsating waveform 402 shown as the waveform for arc AC2(b). Combining waveform 380 with the different waveform 400 of a different waveform 402 produces very small areas or times of concurrent polarity relationships 410, 412, 414, etc. The invention illustrated in FIG. 14 has the AC waveform generated at one arc drastically different than the AC waveform generated at the other arc. This same concept of drastically different waveforms for use in the present invention is illustrated in FIG. 14 wherein waveform 420 is an AC pulse profile waveform and waveform 430 is a sinusoidal profile waveform having about one-half the period of waveform 420. Waveform 420 includes a small penetration positive portion 420a and a large deposition portion 420b with straight line polarity transitions 420c. Waveform 430 includes positive portion 430a and negative portion 430b with vertical polarity transitions 430c. By having these two different waveforms, both the synthesized sinusoidal concept is employed for one electrode and there is no long term concurrent polarity relationship. Thus, the molten metal in puddle P remains somewhat quiescent during the welding operation by both arcs AC1, AC2.

Figure 15:
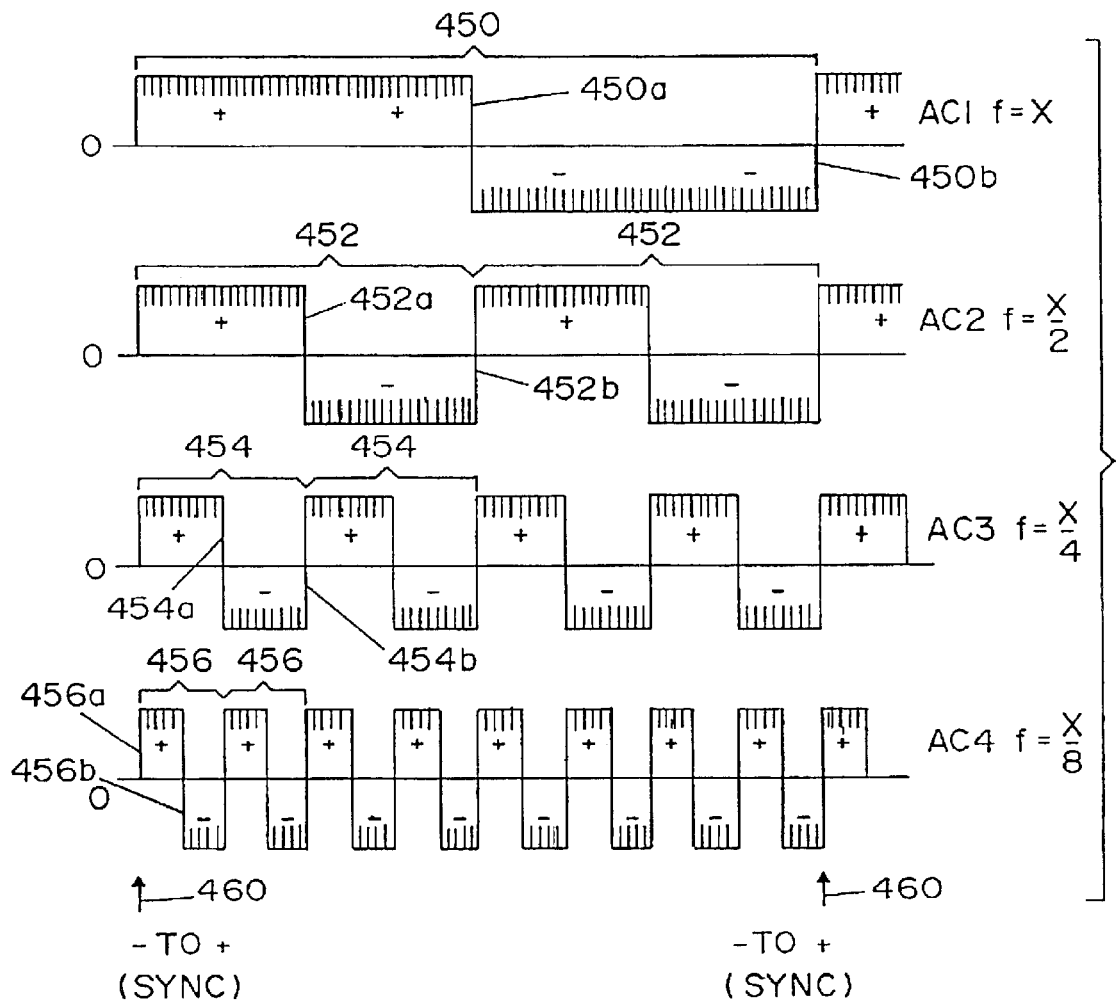
FIG. 15 are current graphs showing waveforms at four adjacent AC arcs of tandem electrodes shaped and synchronized in accordance with an aspect of the invention; and, FIG. 16 is a schematic layout of the software program to cause switching of the paralleled power supplies as soon as the coordinated switch commands have been processed and the next coincident signal has been created.

Another aspect of the present invention is illustrated in FIG. 15 wherein waveforms 450, 452, 454 and 456 are generated by the wave shaper 240 of the power supply for each of four tandem arcs, arc AC1, arc AC2, arc AC3 and arc AC4. The adjacent arcs are aligned as indicated by synchronization signal 460 defining when the waveforms correspond and transition from the negative portion to the positive portion. This synchronization signal is created by generator 80 shown in FIG. 1, except the start pulses are aligned. In this embodiment of the invention first waveform 450 has a positive portion 450a, which is synchronized with both the positive and negative portion of the adjacent waveform 452, 454 and 456. For instance, positive portion 450a is synchronized with and correlated to positive portion 452a and negative portion 452b of waveform 452. In a like manner, the positive portion 452a of waveform 452 is synchronized with and correlated to positive portion 454a and negative portion 454b of waveform 454. The same relationship exist between positive portion 454a and the portions 456a, 456b of waveform 456. The negative portion 450b is synchronized with and correlated to the two opposite polarity portions of aligned waveform 452. The same timing relationship exist between negative portion 452b and waveform 454. In other words, in each adjacent arc one polarity portion of the waveform is correlated to a total waveform of the adjacent arc. In this manner, the collapse and repelling forces of puddle P, as discussed in connection with FIGS. 9 and 10, are dynametically controlled. In this embodiment of the invention, one or more of the positive or negative portions can be synthesized sinusoidal waves as discussed in connection with an aspect of the invention disclosed in FIGS. 11 and 12.

As indicated in FIGS. 1 and 2, when the master controller of switches is to switch, a switch command is issued to master controller 140a of power supply 30. This causes a "kill" signal to be received by the master so a kill signal and polarity logic is rapidly transmitted to the controller of one or more slave power supplies connected in parallel with a single electrode. If standard AC power supplies are used with large snubbers in parallel with the polarity switches, the slave controller or controllers are immediately switched within 1–10 μs after the master power supply receives the switch command. This is the advantage of the high accuracy interface cards or gateways. In practice, the actual switching for current reversal of the paralleled power supplies is not to occur until the output current is below a given value, i.e. about 100 amperes. This allows use of smaller switches.

The implementation of the switching for all power supplies for a single AC arc uses the delayed switching technique where actual switching can occur only after all power supplies are below the given low current level. The delay process is accomplished in the software of the digital processor and is illustrated by the schematic layout of FIG. 16. When the controller of master power supply 500 receives a command signal as represented by line 502, the power supply starts the switching sequence. The master outputs a logic on line 504 to provide the desired polarity for switching of the slaves to correspond with polarity switching of the master. In the commanded switch sequence, the inverter of master power supply 500 is turned off or down so current to electrode E is decreased as read by hall effect transducer 510. The switch command in line 502 causes an immediate "kill" signal as represented by line 512 to the controllers of paralleled slave power supplies 520, 522 providing current to junction 530 as measured by hall effect transducers 532, 534. All power supplies are in the switch sequence with inverters turned off or down. Software comparator circuits 550, 552, 554 compare the decreased current to a given low current referenced by the voltage on line 556. As each power supply decreases below the given value, a signal appears in lines 560, 562, and 564 to the input of a sample and hold circuits 570, 572, and 574, respectively. The circuits are outputted by a strobe signal in line 580 from each of the power supplies. When a set logic is stored in a circuit 570, 572, and 574, a YES logic appears on lines READY[1], READY[2], and READY[3] at the time of the strobe signal. This signal is generated in the power supplies and has a period of 25 μs; however, other high speed strobes could be used. The signals are directed to controller C of the master power supply, shown in dashed lines in FIG. 8. A software ANDing function represented by AND gate 580 has a YES logic output on line 582 when all power supplies are ready to switch polarity. This output condition is directed to clock enable terminal ECLK of software flip flop 600 having its D terminal provided with the desired logic of the polarity to be switched as appearing on line 504. An oscillator or timer operated at about 1 MHz clocks flip flop by a signal on line 602 to terminal CK. This transfers the polarity command logic on line 504 to a Q terminal 604 to provide this logic in line 610 to switch slaves 520, 522 at the same time the identical logic on line 612 switches master power supply 500. After switching, the polarity logic on line 504 shifts to the opposite polarity while master power supply awaits the next switch command based upon the switching frequency. Other circuits can be used to effect the delay in the switching sequence; however, the illustration in FIG. 16 is the present scheme.

The present application relates to the waveforms controlled by a wave shaper or waveform generator of an electric arc power supply including a single power source or multiple power sources correlated as disclosed in Houston U.S. Pat. No. 6,472,634 or Stava U.S. Pat. No. 6,291,798. The invention relates to tandem electrodes powered by an AC waveform. The two adjacent electrodes have waveforms that control the dynamics of the molten metal puddle between the electrodes and/or uses synthesized sine waves to correlate the operation of the tandem welding system with standard transformer welding operations. The invention involves controlling the energy of the positive and negative portions in each of the AC waveforms created by a wave shaper or waveform generator through the use of a high speed switching inverter in accordance with standard practice. Different energy in the positive portion and negative portion controls the relationship of the amount of penetration to the amount of deposition by a particular electrode. This allows operation of adjacent electrodes in a manner to maintain the weld puddle generally quiescent. This action improves the resulting weld bead and the efficiency of the welding operation. To control the weld puddle, adjacent waveforms generated by the wave shaper have different shapes to control the length of time during which a given polarity relationship exist between the adjacent electrodes. In other words, the time that the waveforms of adjacent electrodes have like polarity or opposite polarity is limited by using different shapes and different relationships between the two adjacent AC waveforms generated by the waveform technology using a wave shaper or waveform generator. As disclosed in FIG. 15, synchronizing the wave shapes of adjacent generated waveforms having a frequency of adjacent electrodes which is essentially a multiple of two. All of these unique waveforms are novel and provide beneficial results in an electric arc welding using tandem electrodes, especially for seam welding of pipes in making pipeline sections.

Various waveforms disclosed in this invention can be correlated to mix the relationship of the generated waveforms in a manner defined in the attached claims.

What is claimed is:

1. An electric arc welding system for creating a first AC welding arc with a first current waveform between a first electrode and a workpiece by a first power supply and a second AC welding arc with a second current waveform between a second electrode and a workpiece by a second power supply as said first and second electrodes are moved in unison along a welding path, said first and second power supply each comprising an high speed switching inverter creating its waveform by a number of current pulses occurring at a frequency of at least 18 kHz with the magnitude of each current pulse controlled by a wave shaper and the polarity of said waveforms controlled by a signal, wherein at least said first AC waveform has a positive portion of substantially less energy than its negative portion and is phase shifted from said second AC waveform.

2. An electric arc welding system as defined in claim 1 wherein said first AC waveform is generally sinusoidal in at least one polarity.

3. An electric arc welder system as defined in claim 2 wherein said first AC waveform is generally sinusoidal in both polarities.

4. An electric arc welding system as defined in claim 3 wherein said second AC waveform is generally sinusoidal in at least one polarity.

5. An electric arc welding system as defined in claim 4 wherein said second AC waveform is generally sinusoidal in both polarities.

6. An electric arc welding system as defined in claim 5 wherein said first waveform is generally vertical when switching between polarities.

7. An electric arc welding system as defined in claim 4 wherein said first waveform is generally vertical when switching between polarities.

8. An electric arc welding system as defined in claim 3 wherein said first waveform is generally vertical when switching between polarities.

9. An electric arc welding system as defined in claim 2 wherein said first waveform is generally vertical when switching between polarities.

10. An electric arc welding system as defined in claim 2 wherein said second AC waveform has a positive portion of substantially less energy than its negative portion.

11. An electric arc welding system as defined in claim 2 wherein said positive portions of said AC waveforms each have a time length less than its negative portion.

12. An electric arc welding system as defined in claim 1 wherein said second AC waveform is generally sinusoidal in at least one polarity.

13. An electric arc welding system as defined in claim 12 wherein said second AC waveform is generally sinusoidal in both polarities.

14. An electric arc welding system as defined in claim 13 wherein said first waveform is generally vertical when switching between polarities.

15. An electric arc welding system as defined in claim 12 wherein said first waveform is generally vertical when switching between polarities.

16. An electric arc welding system as defined in claim 12 wherein said second AC waveform has a positive portion of substantially less energy than its negative portion.

17. An electric arc welding system as defined in claim 12 wherein said positive portions of said AC waveforms each have a time length less than its negative portion.

18. An electric arc welding system as defined in claim 12 wherein said welding path is a seam in a pipe.

19. An electric arc welding system as defined in claim 1 wherein said first waveform is generally vertical when switching between polarities.

20. An electric arc welding system as defined in claim 19 wherein said second AC waveform has a positive portion of substantially less energy than its negative portion.

21. An electric arc welding system as defined in claim 19 wherein said positive portions of said AC waveforms each have a time length less than its negative portion.

22. An electric arc welding system as defined in claim 19 wherein said welding path is a seam in a pipe.

23. An electric arc welding system as defined in claim 1 wherein said second AC waveform has a positive portion of substantially less energy than its negative portion.

24. An electric arc welding system as defined in claim 23 wherein said second AC waveform is generally sinusoidal in both polarities.

25. An electric arc welding system as defined in claim 23 wherein said second AC waveform is generally sinusoidal in at least one polarity.

26. An electric arc welder system as defined in claim 23 wherein said first AC waveform is generally sinusoidal in both polarities.

27. An electric arc welding system as defined in claim 23 wherein said first AC waveform is generally sinusoidal in at least one polarity.

28. An electric arc welding system as defined in claim 23 wherein said positive portions of said AC waveforms each have a time length less than its negative portion.

29. An electric arc welding system as defined in claim 28 wherein said welding path is a seam in a pipe.

30. An electric arc welding system as defined in claim 23 wherein said welding path is a seam in a pipe.

31. An electric arc welding system as defined in claim 1 wherein said positive portions of said AC waveforms each have a time length less than its negative portion.

32. An electric arc welding system as defined in claim 1 wherein said welding path is a seam in a pipe.

33. An electric arc welding system for creating a first AC welding arc with a first current waveform, which is generally sinusoidal in at least one polarity, and is between a first electrode and a workpiece by a first power supply and a second AC welding arc with a second current waveform between a second electrode and a workpiece by a second power supply as said first and second electrodes are moved in unison along a welding path, said first and second power supply each comprising a high speed switching inverter creating its waveform by a number of current pulses occurring at a frequency of at least 18 kHz with the magnitude of each current pulse controlled by a wave shaper and the polarity of said waveforms controlled by a logic signal, wherein at least said first AC waveform has a negative portion of substantially less energy than its positive portion and is phase shifted from said second AC waveform.

34. An electric arc welder system as defined in claim 33 wherein said first AC waveform is generally sinusoidal in both polarities.

35. An electric arc welding system as defined in claim 33 wherein said second AC waveform is generally sinusoidal in at least one polarity.

36. An electric arc welding system as defined in claim 35 wherein said second AC waveform is generally sinusoidal in both polarities.

37. An electric arc welding system as defined in claim 33 wherein said first waveform is generally vertical when switching between polarities.

38. An electric arc welding system as defined in claim 33 wherein said second AC waveform has a negative portion substantially less than its positive portion.

39. An electric arc welding system as defined in claim 38 wherein said negative portions of said waveforms each have a time length less than its positive portion.

40. An electric arc welding system as defined in claim 38 wherein said negative portion of said first waveform has a time length less than its positive portion.

41. An electric arc welding system as defined in claim 33 wherein said negative portion of said first waveform has a time length less than its positive portion.

42. An electric arc welding system for creating a first AC welding arc with a first current waveform between a first electrode and a workpiece by a first power supply and a second AC welding arc with a second current waveform between a second electrode and a workpiece by a second power supply as said first and second electrodes are moved in unison along a welding path, said first and second power supply each comprising an high speed switching inverter creating its waveform by a number of current pulses occurring at a frequency of at least 18 kHz with the magnitude of each current pulse controlled by a wave shaper and the polarity of said waveforms controlled by a logic signal, wherein at least said first waveform has a positive portion substantially different in length from its negative portion.

43. An electric arc welding system as defined in claim 42 wherein said first AC waveform is generally sinusoidal in at least one polarity.

44. An electric arc welder system as defined in claim 42 wherein said first AC waveform is generally sinusoidal in both polarities.

45. An electric arc welding system as defined in claim 42 wherein said second AC waveform is generally sinusoidal in at least one polarity.

46. An electric arc welding system as defined in claim 42 wherein said second AC waveform is generally sinusoidal in both polarities.

47. An electric arc welding system as defined in claim 42 wherein said second AC waveform has a positive portion substantially different in length from its negative portion.

48. An electric arc welding system for creating a first AC welding arc with a first current waveform, which is generally sinusoidal in at least one polarity, and is between a first electrode and a workpiece by a first power supply and a second AC welding arc with a second current waveform between a second electrode and a workpiece by a second power supply as said first and second electrodes are moved in unison along a welding path, said first and second power supply each comprising a high speed switching inverter creating its waveform by a number of current pulses occurring at a frequency of at least 18 kHz with the magnitude of each current pulse controlled by a wave shaper and the polarity of said waveforms controlled by a logic signal, wherein said waveforms have a different shape and where there are periods of concurrent polarity relationships defined as like polarities and opposite polarities with the period of any one of said concurrent polarity relationships being less than 20 ms.

49. An electric arc welder system as defined in claim 48 wherein said first AC waveform is generally sinusoidal in both polarities.

50. An electric arc welding system as defined in claim 48 wherein said second AC waveform is generally sinusoidal in at least one polarity.

51. An electric arc welding system as defined in claim 50 wherein said second AC waveform is generally sinusoidal in both polarities.

52. An electric arc welding system as defined in claim 48 wherein the period of any one of said concurrent polarity relationships being substantially less than ½ of the cycle length of either of said waveforms.

53. An electric arc welding system as defined in claim 48 wherein the period of any one of the concurrent polarity relationships is less than 10 ms.

54. An electric arc welding system as defined in claim 48 wherein one of said waveforms has a positive portion with substantially less energy than its negative portion.

55. An electric arc welding system as defined in claim 48 wherein both of said waveforms have a positive portion with substantially less energy than its negative portion.

56. An electric arc welding system as defined in claim 48 wherein one of said waveforms has a negative portion with less energy than is positive portion.

57. An electric arc welding system as defined in claim 48 wherein both of said waveforms each have a negative portion with less energy than its positive portion.

58. An electric arc welding system for creating a first AC welding arc with a first current waveform, which is generally sinusoidal in at least one polarity, and is between a first electrode and a workpiece by a first power supply and a second AC welding arc with a second current waveform between a second electrode and a workpiece by a second power supply as said first and second electrodes are moved in unison along a welding path, said first and second power supply each comprising a high speed switching inverter creating its waveform by a number of current pulses occurring at a frequency of at least 18 kHz with the magnitude of each current pulse controlled by a wave shaper and the polarity of said waveforms controlled by a logic signal, wherein each waveform has a positive portion with a time length and maximum amplitude with the time length of one polarity portion of one waveform being substantially less than the time length of the other opposite polarity portion of said one waveform.

59. An electric arc welder system as defined in claim 58 wherein said first AC waveform is generally sinusoidal in both polarities.

60. An electric arc welding system as defined in claim 58 wherein said second AC waveform is generally sinusoidal in at least one polarity.

61. An electric arc welding system as defined in claim 60 wherein said second AC waveform is generally sinusoidal in both polarities.

62. An electric arc welding system as defined in claim 58 wherein the time length of one polarity portion of the other of said waveforms is substantially less than the time length of the other polarity portion of said other of said waveforms.

63. An electric arc welding system for creating a first AC welding arc with a first current waveform between a first electrode and a workpiece by a first power supply and a second AC welding arc with a second current waveform between a second electrode and a workpiece by a second power supply as said first and second electrodes are moved in unison along a welding path, said first and second power supply each comprising an high speed switching inverter creating its waveform by a number of current pulses occurring at a frequency of at least 18 kHz with the magnitude of each current pulse controlled by a wave shaper and the polarity of said waveforms controlled by a logic signal, wherein each waveform has a positive portion with a time length and maximum amplitude with the maximum amplitude of one polarity portion of one waveform being substantially less than the maximum amplitude of the other opposite polarity portion of said one waveform.

64. An electric arc welding system as defined in claim 63 wherein said first AC waveform is generally sinusoidal in at least one polarity.

65. An electric arc welder system as defined in claim 63 wherein said first AC waveform is generally sinusoidal in both polarities.

66. An electric arc welding system as defined in claim 63 wherein said second AC waveform is generally sinusoidal in at least one polarity.

67. An electric arc welding system as defined in claim 63 wherein said second AC waveform is generally sinusoidal in both polarities.

68. An electric arc welding system as defined in claim 63 wherein the time length of one polarity portion of the other of said waveforms is substantially less than the time length of the other polarity portion of said other of said waveforms.

69. An electric arc welding system as defined in claim 68 wherein the maximum amplitude of one polarity portion of the other of said waveforms is substantially less than the maximum amplitude of the other polarity portion of said other of said waveforms.

70. An electric arc welding system as defined in claim 63 wherein the maximum amplitude of one polarity portion of the other of said waveforms is substantially less than the maximum amplitude of the other polarity portion of said other of said waveforms.

71. An electric arc welding system for creating a first AC welding arc with a first current waveform between a first electrode and a workpiece by a first power supply and a second AC welding arc with a second current waveform between a second electrode and a workpiece by a second power supply as said first and second electrodes are moved in unison along a welding path, said first and second power supply each comprising an high speed switching inverter creating its waveform by a number of current pulses occurring at a frequency of at least 18 kHz with the magnitude of each current pulse controlled by a wave shaper and the polarity of said waveforms controlled by a signal, wherein said first AC waveform is generally sinusoidal in at least one polarity.

72. An electric arc welder system as defined in claim 71 wherein said first AC waveform is generally sinusoidal in both polarities.

73. An electric arc welding system as defined in claim 72 wherein said second AC waveform is generally sinusoidal in at least one polarity.

74. An electric arc welding system as defined in claim 73 wherein said second AC waveform is generally sinusoidal in both polarities.

75. An electric arc welding system as defined in claim 74 wherein said waveforms are substantially vertical when transitioning between polarities.

76. An electric arc welding system as defined in claim 71 wherein said second AC waveform is generally sinusoidal in at least one polarity.

77. An electric arc welding system as defined in claim 76 wherein said waveforms are substantially vertical when transitioning between polarities.

78. An electric arc welding system as defined in claim 71 wherein said second AC waveform is generally sinusoidal in both polarities.

79. An electric arc welding system as defined in claim 78 wherein said waveforms are substantially vertical when transitioning between polarities.

80. An electric arc welding system as defined in claim 71 wherein said waveforms are substantially vertical when transitioning between polarities.

81. An electric arc welding system for creating a first AC welding arc with a first current waveform, which is generally sinusoidal in at least one polarity, and is between a first electrode and a workpiece by a first power supply and a second AC welding arc with a second current waveform between a second electrode and a workpiece by a second power supply as said first and second electrodes are moved in unison along a welding path, said first and second power supply each comprising a high speed switching inverter creating its waveform by a number of current pulses occurring at a frequency of at least 18 kHz with the magnitude of each current pulse controlled by a wave shaper and the polarity of said waveforms controlled by a signal, wherein said first waveform has a positive portion generally synchronized with and correlated to the positive and negative portions of one of said second waveforms and a negative portion generally synchronized with and correlated to the positive and negative portion of the next second waveform following said one of said second waveforms.

82. An electric arc welding system as defined in claim 81 wherein said positive and negative portions of said first and second waveforms are essentially the same shape but opposite in polarity.

83. An electric arc welder system as defined in claim 81 wherein said first AC waveform is generally sinusoidal in both polarities.

84. An electric arc welding system as defined in claim 81 wherein said second AC waveform is generally sinusoidal in at least one polarity.

85. An electric arc welding system as defined in claim 84 wherein said second AC waveform is generally sinusoidal in both polarities.

86. An electric arc welding system as defined in claim 81 wherein said first waveform is generally vertical when switching between polarities.

* * * * *